US007653131B2

(12) United States Patent  
Pan et al.

(10) Patent No.: US 7,653,131 B2
(45) Date of Patent: Jan. 26, 2010

(54) IDENTIFICATION OF REPLAY SEGMENTS

(75) Inventors: Hao Pan, Vancouver, WA (US); Baoxin Li, Vancouver, WA (US)

(73) Assignee: Sharp Laboratories of America, Inc., Camass, WA (US)

( * ) Notice: Subject to any disclaimer, the term of this patent is extended or adjusted under 35 U.S.C. 154(b) by 776 days.

(21) Appl. No.: 11/292,917

(22) Filed: Dec. 2, 2005

(65) Prior Publication Data

US 2006/0083304 A1   Apr. 20, 2006

Related U.S. Application Data

(62) Division of application No. 10/259,367, filed on Sep. 27, 2002, now Pat. No. 7,474,698.

(60) Provisional application No. 60/345,001, filed on Oct. 19, 2001.

(51) Int. Cl.
H04N 7/12 (2006.01)
H04B 1/66 (2006.01)

(52) U.S. Cl. .................................. 375/240.08
(58) Field of Classification Search ............. 375/240.08
See application file for complete search history.

(56) References Cited

U.S. PATENT DOCUMENTS

| 4,183,056 | A | 1/1980 | Evans et al. |
|---|---|---|---|
| 4,253,108 | A | 2/1981 | Engel |
| 4,298,884 | A | 11/1981 | Reneau |
| 4,321,635 | A | 3/1982 | Tsuyuguchi |
| 4,324,402 | A | 4/1982 | Klose |
| 4,520,404 | A | 5/1985 | Von Kohorn |
| 4,729,044 | A | 3/1988 | Kiesel |
| 4,937,685 | A | 6/1990 | Barker et al. |
| 5,012,334 | A | 4/1991 | Etra |
| 5,027,400 | A | 6/1991 | Baji et al. |
| 5,101,364 | A | 3/1992 | Davenport et al. |
| 5,109,482 | A | 4/1992 | Bohrman |
| 5,148,154 | A | 9/1992 | MacKay et al. |
| 5,200,825 | A | 4/1993 | Perine |
| 5,222,924 | A | 6/1993 | Shin et al. |
| 5,223,924 | A | 6/1993 | Strubbe |
| 5,241,671 | A | 8/1993 | Reed et al. |
| 5,288,069 | A | 2/1994 | Matsumoto |
| D348,251 | S | 6/1994 | Hendricks |
| 5,333,091 | A | 7/1994 | Iggulden et al. |
| 5,339,393 | A | 8/1994 | Duffy et al. |
| D354,059 | S | 1/1995 | Hendricks |
| 5,381,477 | A | 1/1995 | Beyers, II et al. |

(Continued)

FOREIGN PATENT DOCUMENTS

EP   0 854 645   7/1998

(Continued)

OTHER PUBLICATIONS

"User Preference Description for MPEG-7," ISO/IEC JTC1/SC29/VVG11, MPEG 99/MXXXX, Maui, Hawaii, Dec. 1999, pp. 1-18.

(Continued)

*Primary Examiner*—Nhon T Diep
(74) *Attorney, Agent, or Firm*—Chernoff, Vilhauer, McClung & Stenzel, LLP

(57) ABSTRACT

Identification of segments based upon scoreboards and logos.

12 Claims, 15 Drawing Sheets

GENERAL LOGO TEMPLATE IDENTIFICATION

U.S. PATENT DOCUMENTS

| | | |
|---|---|---|
| 5,404,316 A | 4/1995 | Klingler et al. |
| 5,410,344 A | 4/1995 | Graves et al. |
| 5,424,770 A | 6/1995 | Schmelzer et al. |
| 5,434,678 A | 7/1995 | Abecassis |
| 5,444,499 A | 8/1995 | Saitoh |
| 5,452,016 A | 9/1995 | Ohara et al. |
| 5,459,830 A | 10/1995 | Ohba et al. |
| 5,483,278 A | 1/1996 | Strubbe et al. |
| D368,263 S | 3/1996 | Hendricks |
| 5,521,841 A | 5/1996 | Arman et al. |
| 5,550,965 A | 8/1996 | Gabbe et al. |
| 5,559,549 A | 9/1996 | Hendricks et al. |
| 5,589,945 A | 12/1996 | Abecassis |
| 5,600,364 A | 2/1997 | Hendricks et al. |
| 5,600,573 A | 2/1997 | Hendricks et al. |
| 5,600,781 A | 2/1997 | Root et al. |
| 5,610,653 A | 3/1997 | Abecassis |
| 5,634,849 A | 6/1997 | Abecassis |
| 5,635,982 A | 6/1997 | Zhang et al. |
| 5,635,989 A | 6/1997 | Rothmuller |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |
| 5,664,227 A | 9/1997 | Mauldin et al. |
| 5,675,752 A | 10/1997 | Scott et al. |
| 5,682,195 A | 10/1997 | Hendricks et al. |
| 5,682,460 A | 10/1997 | Hyziak et al. |
| 5,684,918 A | 11/1997 | Abecassis |
| 5,694,163 A | 12/1997 | Harrison |
| 5,696,869 A | 12/1997 | Abecassis |
| 5,696,965 A | 12/1997 | Dedrick |
| 5,710,884 A | 1/1998 | Dedrick |
| 5,717,814 A | 2/1998 | Abecassis |
| 5,717,879 A | 2/1998 | Moran et al. |
| 5,717,923 A | 2/1998 | Dedrick |
| 5,724,472 A | 3/1998 | Abecassis |
| 5,727,129 A | 3/1998 | Barrett et al. |
| 5,732,216 A | 3/1998 | Logan et al. |
| 5,734,853 A | 3/1998 | Hendricks et al. |
| 5,751,953 A | 5/1998 | Shiels et al. |
| 5,758,257 A | 5/1998 | Herz et al. |
| 5,758,259 A | 5/1998 | Lawler |
| 5,761,881 A | 6/1998 | Wall |
| 5,764,916 A | 6/1998 | Busey et al. |
| 5,774,357 A | 6/1998 | Hoffberg et al. |
| 5,774,666 A | 6/1998 | Portuesi |
| 5,778,108 A | 7/1998 | Coleman, Jr. |
| 5,781,188 A | 7/1998 | Amiot et al. |
| 5,794,210 A | 8/1998 | Goldhaber et al. |
| 5,797,001 A | 8/1998 | Augenbraun et al. |
| 5,798,785 A | 8/1998 | Hendricks et al. |
| 5,805,733 A | 9/1998 | Wang et al. |
| 5,809,426 A | 9/1998 | Radojevic et al. |
| 5,821,945 A | 10/1998 | Yeo et al. |
| 5,822,537 A | 10/1998 | Katseff et al. |
| 5,828,809 A | 10/1998 | Chang et al. |
| 5,828,839 A | 10/1998 | Moncreiff |
| 5,835,087 A | 11/1998 | Herz et al. |
| D402,310 S | 12/1998 | Hendricks |
| 5,848,396 A | 12/1998 | Gerace |
| 5,857,190 A | 1/1999 | Brown |
| 5,861,881 A | 1/1999 | Freeman et al. |
| 5,867,226 A | 2/1999 | Wehmeyer et al. |
| 5,867,386 A | 2/1999 | Hoffberg et al. |
| 5,875,107 A | 2/1999 | Nagai et al. |
| 5,875,108 A | 2/1999 | Hoffberg et al. |
| 5,877,821 A | 3/1999 | Newlin et al. |
| 5,878,222 A | 3/1999 | Harrison |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,907,324 A | 5/1999 | Larson et al. |
| 5,913,013 A | 6/1999 | Abecassis |
| 5,913,030 A | 6/1999 | Lotspiech et al. |
| 5,920,300 A | 7/1999 | Yamazaki et al. |
| 5,920,360 A | 7/1999 | Coleman, Jr. |
| 5,920,477 A | 7/1999 | Hoffberg et al. |
| 5,923,365 A | 7/1999 | Tamir et al. |
| 5,926,624 A | 7/1999 | Katz et al. |
| 5,930,783 A | 7/1999 | Li et al. |
| 5,933,811 A | 8/1999 | Angles et al. |
| 5,945,988 A | 8/1999 | Williams et al. |
| 5,956,026 A | 9/1999 | Ratakonda |
| 5,956,037 A | 9/1999 | Osawa et al. |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,977,964 A | 11/1999 | Williams et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,094 A | 11/1999 | Eggen et al. |
| 5,995,095 A | 11/1999 | Ratakonda |
| 6,002,833 A | 12/1999 | Abecassis |
| 6,005,565 A | 12/1999 | Legall et al. |
| 6,005,597 A | 12/1999 | Barrett et al. |
| 6,006,265 A | 12/1999 | Rangan et al. |
| 6,011,895 A | 1/2000 | Abecassis |
| 6,014,183 A | 1/2000 | Hoang |
| 6,020,883 A | 2/2000 | Herz et al. |
| 6,029,195 A | 2/2000 | Herz |
| 6,038,367 A | 3/2000 | Abecassis |
| 6,041,323 A | 3/2000 | Kubota |
| 6,049,821 A | 4/2000 | Theriault et al. |
| 6,052,554 A | 4/2000 | Hendricks et al. |
| 6,055,018 A | 4/2000 | Swan |
| 6,055,569 A | 4/2000 | O'Brien et al. |
| 6,060,167 A | 5/2000 | Morgan et al. |
| 6,064,385 A | 5/2000 | Sturgeon et al. |
| 6,064,449 A | 5/2000 | White et al. |
| 6,067,401 A | 5/2000 | Abecassis |
| 6,070,167 A | 5/2000 | Qian et al. |
| 6,072,934 A | 6/2000 | Abecassis |
| 6,076,166 A | 6/2000 | Moshfeghi et al. |
| 6,078,917 A | 6/2000 | Paulsen, Jr. et al. |
| 6,078,928 A | 6/2000 | Schnase et al. |
| 6,081,278 A | 6/2000 | Chen |
| 6,081,750 A | 6/2000 | Hoffberg et al. |
| 6,088,455 A | 7/2000 | Logan et al. |
| 6,088,722 A | 7/2000 | Herz et al. |
| 6,091,886 A | 7/2000 | Abecassis |
| RE36,801 E | 8/2000 | Logan et al. |
| 6,100,941 A | 8/2000 | Dimitrova et al. |
| 6,115,709 A | 9/2000 | Gilmour et al. |
| 6,122,657 A | 9/2000 | Hoffman, Jr. et al. |
| 6,128,624 A | 10/2000 | Papierniak et al. |
| 6,133,909 A | 10/2000 | Schein et al. |
| 6,137,486 A | 10/2000 | Yoshida et al. |
| 6,141,041 A | 10/2000 | Carlbom et al. |
| 6,141,060 A | 10/2000 | Honey et al. |
| 6,144,375 A | 11/2000 | Jain et al. |
| 6,151,444 A | 11/2000 | Abecassis |
| D435,561 S | 12/2000 | Pettigrew et al. |
| 6,157,377 A | 12/2000 | Shah-Nazaroff et al. |
| 6,160,989 A | 12/2000 | Hendricks et al. |
| 6,161,142 A | 12/2000 | Wolfe et al. |
| 6,163,316 A | 12/2000 | Killian |
| 6,163,779 A | 12/2000 | Mantha et al. |

| | | |
|---|---|---|
| 6,169,542 B1 | 1/2001 | Hooks et al. |
| 6,177,931 B1 | 1/2001 | Alexander et al. |
| 6,181,335 B1 | 1/2001 | Hendricks et al. |
| 6,185,625 B1 | 2/2001 | Tso et al. |
| 6,195,497 B1 | 2/2001 | Nagasaka et al. |
| 6,198,767 B1 | 3/2001 | Greenfield et al. |
| 6,199,076 B1 | 3/2001 | Logan et al. |
| 6,201,536 B1 | 3/2001 | Hendricks et al. |
| 6,208,805 B1 | 3/2001 | Abecassis |
| 6,212,527 B1 | 4/2001 | Gustman |
| 6,215,526 B1 | 4/2001 | Barton et al. |
| 6,216,129 B1 | 4/2001 | Eldering |
| 6,219,837 B1 | 4/2001 | Yeo et al. |
| 6,226,678 B1 | 5/2001 | Mattaway et al. |
| 6,230,172 B1 | 5/2001 | Purnaveja et al. |
| 6,230,501 B1 | 5/2001 | Bailey, Sr. et al. |
| 6,233,289 B1 | 5/2001 | Fredrickson |
| 6,233,389 B1 | 5/2001 | Barton et al. |
| 6,233,586 B1 | 5/2001 | Chang et al. |
| 6,233,590 B1 | 5/2001 | Shaw et al. |
| 6,236,395 B1 | 5/2001 | Sezan et al. |
| 6,240,406 B1 | 5/2001 | Tannen |
| 6,252,544 B1 | 6/2001 | Hoffberg |
| 6,253,203 B1 | 6/2001 | O'Flaherty et al. |
| 6,269,216 B1 | 7/2001 | Abecassis |
| 6,275,268 B1 | 8/2001 | Ellis et al. |
| 6,286,140 B1 | 9/2001 | Ivanyi |
| 6,286,141 B1 | 9/2001 | Browne et al. |
| 6,289,165 B1 | 9/2001 | Abecassis |
| 6,298,482 B1 | 10/2001 | Seidman et al. |
| 6,304,665 B1 | 10/2001 | Cavallaro et al. |
| 6,304,715 B1 | 10/2001 | Abecassis |
| 6,311,189 B1 | 10/2001 | DeVries et al. |
| 6,317,718 B1 | 11/2001 | Fano |
| 6,317,881 B1 | 11/2001 | Shah-Nazaroff et al. |
| 6,320,624 B1 | 11/2001 | Ayer et al. |
| 6,324,338 B1 | 11/2001 | Wood et al. |
| 6,339,842 B1 | 1/2002 | Fernandez et al. |
| 6,342,904 B1 | 1/2002 | Vasudevan et al. |
| 6,353,444 B1 | 3/2002 | Katta et al. |
| 6,363,160 B1 | 3/2002 | Bradski et al. |
| 6,363,380 B1 | 3/2002 | Dimitrova |
| 6,370,504 B1 | 4/2002 | Zick et al. |
| 6,370,688 B1 | 4/2002 | Hejna, Jr. |
| 6,374,404 B1 | 4/2002 | Brotz et al. |
| 6,405,371 B1 | 6/2002 | Oosterhout et al. |
| 6,412,008 B1 | 6/2002 | Fields et al. |
| 6,418,168 B1 | 7/2002 | Narita |
| 6,421,680 B1 | 7/2002 | Kumhyr et al. |
| 6,425,133 B1 | 7/2002 | Leary |
| 6,426,761 B1 | 7/2002 | Kanevsky et al. |
| 6,426,974 B2 | 7/2002 | Takahashi et al. |
| 6,438,579 B1 | 8/2002 | Hosken |
| 6,439,572 B1 | 8/2002 | Bowen |
| 6,446,261 B1 | 9/2002 | Rosser |
| 6,470,378 B1 | 10/2002 | Tracton et al. |
| 6,480,667 B1 | 11/2002 | O'Connor |
| 6,487,390 B1 | 11/2002 | Virine et al. |
| 6,490,320 B1 | 12/2002 | Vetro et al. |
| 6,498,783 B1 | 12/2002 | Lin |
| 6,522,342 B1 | 2/2003 | Gagnon et al. |
| 6,530,082 B1 | 3/2003 | Del Sesto et al. |
| 6,535,639 B1 | 3/2003 | Uchihachi et al. |
| 6,542,546 B1 | 4/2003 | Vetro et al. |
| 6,543,053 B1 | 4/2003 | Li et al. |
| 6,546,555 B1 | 4/2003 | Hjelsvold et al. |
| 6,549,643 B1 | 4/2003 | Toklu et al. |
| 6,553,178 B2 | 4/2003 | Abecassis |
| 6,556,767 B2 | 4/2003 | Okayama et al. |
| 6,571,279 B1 | 5/2003 | Herz et al. |
| 6,578,075 B1 | 6/2003 | Nieminen et al. |
| 6,581,207 B1 | 6/2003 | Sumita et al. |
| 6,587,127 B1 | 7/2003 | Leeke et al. |
| 6,593,936 B1 | 7/2003 | Huang et al. |
| 6,594,699 B1 | 7/2003 | Sahai et al. |
| 6,597,859 B1 | 7/2003 | Leinhart et al. |
| 6,611,876 B1 | 8/2003 | Barrett et al. |
| 6,614,987 B1 | 9/2003 | Ismail et al. |
| 6,621,895 B1 | 9/2003 | Giese |
| 6,628,302 B2 | 9/2003 | White et al. |
| 6,637,032 B1 | 10/2003 | Feinleib |
| 6,658,095 B1 | 12/2003 | Yoakum et al. |
| 6,665,423 B1 | 12/2003 | Mehrotra et al. |
| 6,675,158 B1 | 1/2004 | Rising et al. |
| 6,678,635 B2 | 1/2004 | Tovinkere et al. |
| 6,678,659 B1 | 1/2004 | Van Kommer |
| 6,681,395 B1 | 1/2004 | Nishi |
| 6,691,126 B1 | 2/2004 | Syeda-Mahmood |
| 6,697,523 B1 | 2/2004 | Divakaran et al. |
| 6,704,929 B1 | 3/2004 | Ozer et al. |
| 6,724,933 B1 | 4/2004 | Lin et al. |
| 6,741,655 B1 | 5/2004 | Chang et al. |
| 6,754,904 B1 | 6/2004 | Cooper et al. |
| 6,754,906 B1 | 6/2004 | Finseth et al. |
| 6,766,362 B1 | 7/2004 | Miyasaka et al. |
| 6,774,917 B1 | 8/2004 | Foote et al. |
| 6,810,200 B1 | 10/2004 | Aoyama et al. |
| 6,813,775 B1 | 11/2004 | Finseth et al. |
| 6,820,278 B1 | 11/2004 | Ellis |
| 6,829,781 B1 | 12/2004 | Bhagavath et al. |
| 6,868,440 B1 | 3/2005 | Gupta et al. |
| 6,880,171 B1 | 4/2005 | Ahmad et al. |
| 6,898,762 B2 | 5/2005 | Ellis et al. |
| 6,925,455 B2 | 8/2005 | Gong et al. |
| 6,931,595 B2 | 8/2005 | Pan et al. |
| 6,934,964 B1 | 8/2005 | Schaffer et al. |
| 6,961,954 B1 * | 11/2005 | Maybury et al. ............... 725/53 |
| 6,970,510 B1 | 11/2005 | Wee et al. |
| 6,971,105 B1 | 11/2005 | Weber et al. |
| 6,981,129 B1 | 12/2005 | Boggs et al. |
| 6,983,478 B1 | 1/2006 | Grauch, et al. |
| 6,990,679 B2 * | 1/2006 | Curreri ....................... 725/56 |
| 6,993,245 B1 | 1/2006 | Harville |
| 7,003,792 B1 | 2/2006 | Yuen |
| 7,026,964 B2 | 4/2006 | Baldwin et al. |
| 7,055,168 B1 | 5/2006 | Errico et al. |
| 7,065,709 B2 | 6/2006 | Ellis et al. |
| 7,096,486 B1 | 8/2006 | Ukai et al. |
| 7,127,735 B1 | 10/2006 | Lee et al. |
| 7,130,866 B2 | 10/2006 | Schaffer |
| 7,136,710 B1 | 11/2006 | Hoffberg et al. |
| 7,146,626 B1 | 12/2006 | Arsenault et al. |
| 7,150,030 B1 | 12/2006 | Eldering et al. |
| 7,185,355 B1 | 2/2007 | Ellis et al. |
| 7,199,798 B1 | 4/2007 | Echigo et al. |
| 7,249,366 B1 | 7/2007 | Flavin |
| 7,296,285 B1 | 11/2007 | Jun et al. |
| 7,343,381 B2 | 3/2008 | Shin |
| 7,380,262 B2 | 5/2008 | Wang et al. |
| 7,454,775 B1 | 11/2008 | Schaffer et al. |
| 2001/0030664 A1 | 10/2001 | Shulman et al. |
| 2001/0043744 A1 | 11/2001 | Hieda |
| 2002/0013943 A1 | 1/2002 | Haberman et al. |
| 2002/0018594 A1 | 2/2002 | Xu et al. |
| 2002/0026345 A1 | 2/2002 | Juels |
| 2002/0069218 A1 | 6/2002 | Sull et al. |
| 2002/0079165 A1 | 6/2002 | Wolfe |
| 2002/0080162 A1 | 6/2002 | Pan et al. |
| 2002/0083473 A1 | 6/2002 | Agnihotri et al. |
| 2002/0087967 A1 | 7/2002 | Conkwright et al. |
| 2002/0093591 A1 | 7/2002 | Gong et al. |
| 2002/0097165 A1 | 7/2002 | Hulme |
| 2002/0104087 A1 | 8/2002 | Schaffer et al. |
| 2002/0108112 A1 | 8/2002 | Wallace et al. |
| 2002/0120929 A1 | 8/2002 | Schwalb et al. |
| 2002/0133412 A1 | 9/2002 | Oliver et al. |

| | | | |
|---|---|---|---|
| 2002/0140719 | A1 | 10/2002 | Amir et al. |
| 2002/0141619 | A1 | 10/2002 | Standridge et al. |
| 2002/0156909 | A1 | 10/2002 | Harrington |
| 2002/0178135 | A1 | 11/2002 | Tanaka |
| 2002/0184220 | A1 | 12/2002 | Teraguchi et al. |
| 2002/0190991 | A1 | 12/2002 | Efran et al. |
| 2002/0194589 | A1 | 12/2002 | Cristofalo et al. |
| 2003/0001880 | A1 | 1/2003 | Holtz et al. |
| 2003/0007555 | A1 | 1/2003 | Divakaran et al. |
| 2003/0026592 | A1 | 2/2003 | Kawahara et al. |
| 2003/0033288 | A1 | 2/2003 | Shanahan et al. |
| 2003/0066068 | A1 | 4/2003 | Gutta et al. |
| 2003/0067554 | A1 | 4/2003 | Klarfeld et al. |
| 2003/0072440 | A1 | 4/2003 | Murray et al. |
| 2003/0081937 | A1 | 5/2003 | Li |
| 2003/0084448 | A1 | 5/2003 | Soundararajan |
| 2003/0084450 | A1 | 5/2003 | Thurston et al. |
| 2003/0088872 | A1 | 5/2003 | Maissel et al. |
| 2003/0093792 | A1 | 5/2003 | Labeeb et al. |
| 2003/0105682 | A1 | 6/2003 | Dicker et al. |
| 2003/0172374 | A1 | 9/2003 | Vinson et al. |
| 2003/0177503 | A1 | 9/2003 | Sull et al. |
| 2003/0182663 | A1 | 9/2003 | Gudorf et al. |
| 2003/0187650 | A1 | 10/2003 | Moore et al. |
| 2003/0229900 | A1 | 12/2003 | Reisman |
| 2004/0003041 | A1 | 1/2004 | Moore et al. |
| 2004/0015569 | A1 | 1/2004 | Lonnfors et al. |
| 2004/0017389 | A1 | 1/2004 | Pan et al. |
| 2004/0030750 | A1 | 2/2004 | Moore et al. |
| 2004/0032486 | A1 | 2/2004 | Shusman |
| 2004/0088289 | A1 | 5/2004 | Xu et al. |
| 2004/0098754 | A1 | 5/2004 | Vella et al. |
| 2004/0125124 | A1 | 7/2004 | Kim et al. |
| 2004/0125877 | A1 | 7/2004 | Chang et al. |
| 2004/0197088 | A1 | 10/2004 | Ferman et al. |
| 2004/0227768 | A1 | 11/2004 | Bates et al. |
| 2004/0231003 | A1 | 11/2004 | Cooper et al. |
| 2004/0250272 | A1 | 12/2004 | Durden et al. |
| 2005/0021784 | A1 | 1/2005 | Prehofer |
| 2005/0028194 | A1 | 2/2005 | Elenbaas et al. |
| 2005/0055713 | A1 | 3/2005 | Lee et al. |
| 2005/0102202 | A1 | 5/2005 | Linden et al. |
| 2005/0131906 | A1 | 6/2005 | Shin |
| 2005/0251827 | A1 | 11/2005 | Ellis et al. |
| 2005/0262542 | A1 | 11/2005 | DeWeese et al. |
| 2006/0129544 | A1 | 6/2006 | Yoon et al. |
| 2007/0011148 | A1 | 1/2007 | Burkey et al. |

FOREIGN PATENT DOCUMENTS

| | | |
|---|---|---|
| EP | 0 878 964 | 11/1998 |
| EP | 1250807 | 10/2002 |
| GB | 2 325 537 | 11/1998 |
| JP | 08125957 | 5/1996 |
| JP | 09322154 | 12/1997 |
| JP | 2000-229577 | 8/2000 |
| JP | 2001-036861 | 2/2001 |
| JP | 2001-085717 | 3/2001 |
| JP | 2001-206550 | 7/2001 |
| JP | 2002-503896 | 2/2002 |
| WO | WO 98/56188 | 12/1988 |
| WO | WO 94/14284 | 6/1994 |
| WO | WO 99/01984 | 1/1999 |
| WO | WO 99/04143 | 1/1999 |
| WO | WO 99/12194 | 3/1999 |
| WO | WO 99/65237 | 12/1999 |
| WO | WO 01/50753 | 7/2001 |

OTHER PUBLICATIONS

"A Proposal for User Preference Descriptions in MPEG-7," ISO/IEC JTC1SC29/WG11 M5222, MPEG 99, Oct. 4, 1999, pp. 1-6.

Peng Xu, et al., "Algorithms and System for High-Level Structure Analysis and Event Detection in Soccer Video," Columbia University, ADVENT—Technical Report #111, Jun. 2001.

Keith Millar and David White, "A Schema for TV-Anytime: Segmentation Metadata AN195," NDS Contribution from MyTV, NDS Limited 2000, 27 pages.

Keith Millar et al., "A Schema for TV-Anytime Segmentation Metadata AN 194r! myTV project," NDS Systems Division, NDS Limited 2000, 28 pages.

S.E. Levinson, L. R. Rabiner, and M. M. Sondhi, "An Introduction to the Application of the Theory of Probabilistic Functions of a Markov Process to Automatic Speech Recognition," Copyright 1983 American Telephone and Telegraph company, The Bell system Technical Journal, vol. 62, No. 4, Apr. 1983, pp. 1035-1074.

Dennis Yow, et al., "Analysis and Presentation of Soccer Highlights from Digital Video," To appear in the Proceedings, Second Asian Conference on Computer Vision (ACCV '95).

Drew D. Saur, et al. "Automated Analysis and Annotation of Basketball Video," SPIE vol. 3022, pp. 176-187, 1997.

Hao Pan, et al., "Automatic Detection of Replay Segments in Broadcast Sports Programs by Detection of Logos in Scene Transitions," 2002 IEEE, pp. IV-3385-IV-3388.

Yihong Gong, et al., "Automatic Parsing of TV soccer Programs," 1995 IEEE, pp. 167-174.

Jonathan D. Courtney, "Automatic Video Indexing via Object Motion Analysis," Pattern Recognition, vol. 30, No. 4, pp. 607-625, 1997.

Yong Rui, et al. "Automatically Extracting Highlights for TV Baseball Programs," ACM Multimedia 2000 Los Angeles, CA, USA, pp. 105-115.

Nuno Vasconcelos and Andrew Lippman, "Bayesian Modeling of Video Editing and Structure: Semantic Features for Video Summarization and Browsing," 1998 IEEE, pp. 153-157.

Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-3425, Mar. 20, 1998.

Francis C. Li et al., "Browsing Digital Video," CHI 2000 Apr. 1-6, 2000, CHI Letters vol. 2 issue 1, pp. 169-176.

Franklin Reynolds, et al. "Composite Capability/Preference Profiles (CC/PP): A user side framework for content negotiation," W3C Note Jul. 27, 1999, http://www.w3.org/1999/07/NOTE-CCPP-19990727/, 15 pages.

T. Lambrou, et al., "Classification of Audio Signals Using Statistical Features on Time and Wavelet Transform Domains," 1998 IEEE, pp. 3621-3624.

Joshua Alspector,et al., "Comparing Feature-based and Clique-based User Models for Movie Selection," Digital Libraries 98, Pittsburgh, PA, Copyright ACM 1998, pp. 11-18.

Rainer Lienhart, "Comparison of Automatic Shot Boundary Detection Algorithms," Part of the IS&T/SPIE conference on Storage and Retrieval for image and Video Databases VII, San Jose, CA, Jan. 1999, SPIE vol. 3656, pp. 290-301.

John Canny, "A Computational Appraoch to Edge Detection," IEEE Transactions on Pattern Analysis and Machine Intelligence, vol. PAMI-8, No. 6, Nov. 1986, IEEE 1986, pp. 679-698.

Richard Qian et al., "A Computational Approach to Semantic Event Detection," 1999 IEEE, pp. 200-206.

F. Arman, et al., "Content-based Browsing of Video Sequences," to appear in the Proceedings of ACM International Conference on Multimedia '94, Oct. 15-20, San Francisco, CA, 7 pages.

Hongjiang Zhang, et al. "Content-Based Video Browsing Tools," SPIE vol. 2417, 1995, pp. 389-398.

Stephen W. Smoliar, et al. "Content-Based Video Indexing and Retrieval," 1994 IEEE, pp. 62-72.

Stefan Eickeler, et al., "Content-based Video Indexing of TV Broadcast News Using Hidden Markov Models," Proceedings of IEEE International Conference on Acoustics, Speech, and Signal Processing, Phoenix, AZ, 1999, 4 pages.

Kathy Bohrer and Bobby Holland, editors, "Customer Profile Exchange (CPExchange) Specification," Oct. 20, 2000, Version 1.0, International digital Enterprise Alliance, Inc. (IDEAlliance), pp. 1-127.

Jane Hunter (DSTC Pty Ltd), Editor, "DDL Working Draft 3.0," ISO/IEC JTC1/SC29/WG11 N3391, MPEG 00/ May 2000 (Geneva), 23 pages.

Richard J. Qian, et al. "Description Schemes for Consumer Video Applications," Proposal ID 429, ISO/IEC JTC1/SC29/WG11—MPEG-7 Proposal, Feb. 1999.

Zhu Liu and Qian Huang, "Detecting News Reporting Using Audio/Visual Information," 1999 IEEE, pp. 324-328.

Y Kawai, "Detection of Replay Scenes in Broadcasted Sports Video by focusing on digital Video Effects," IE/CE (D-II), vol. J84-D-II, No. 2, pp. 432-435, Feb. 2001, (in Japanese), pp. 432-437.

H. Pan, et al. "Detection of Slow-Motion Replay Segments in sports Video for Highlights Generation," Proceedings of IEEE International Conference on Acoustics, Speech, and signal Processing, Salt Lake City, UT, 2001, 4 pages.

Alan E Bell, "The dynamic digital disk," IEEE Spectrum, Oct. 1999, pp. 28-35.

Minerva Yeung, "Extracting Story Units from Long Programs for Video Browsing and Navigation," Proceedings of Multimedia 1996, 1996 IEEE, pp. 296-304.

Boon-Lock Yeo et al., "On the Extraction of DC Sequence from MPEG Compressed Video," 1995 IEEE, pp. 260-263.

Frank R. Kschischang, et al., "Factor Graphs and the Sum-Product Algorithm," IEEE Transactions on Information Theory, vol. 47, No. 2, Feb. 2001, pp. 498-519.

John S. Boreczky, et al. "A Hidden Markov Model Framework for Video Segmentation Using Audio and Image Features," Proceedings of IEEE International Conference on Acoustics, Speech, and Signal Processing, Seattle, WA, 1998, 4 pages.

Wayne Wolf, "Hidden Markov Model Parsing of Video Programs," Proceedings of the 1997 IEEE International Conference on Acoustics, Speech, and Signal Processing (ICASSP '97), pp. 2609-2611.

Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.

M. R. Naphade, et al. "A High-Performance Shot Boundary Detection Algorithm Using Multiple Cues," Proceedings of IEEE International Conference on Image Processing, Chicago, IL, 1998, pp. 884-887.

Josh Bernoff, "How Cable TV Can Beat Satellite," WholeView TechStrategy Rsearch, Apr. 2002 Forrester Research, Inc., 400 Technology Square, Cambridge, MA 02139 USA.

B. B. Chaudhuri, et al., "Improved fractal geometry based texture segmentation technique," IEE Proceedings-E, vol. 140, No. 5, Sep. 1993, pp. 233-241.

Toshio Kawashima, et al., "Indexing of Baseball Telecast for Content-based Video Retrieval," Dept. of Information engineering, Hokkaido University, Kita-13, Nishi-8, Sapporo, 060-8628, Japan, 1998 IEEE, pp. 871-874.

Nathaniel J. Thurston, et al. "Intelligent Audience guidance: The New Paradigm in Television Navigation," Predictive Networks, Inc., Feb. 21, 2002, 9 pages.

Dulce Ponceleon, et al. "Key to Effective Video Retrieval: Effective Cataloging and Browsing," ACM Multimedia '98, Bristol, UK, 1998, pp. 99-107.

Henry Lieberman, et al. "Let's Browse: A collaborative Web Browsing Agent," Massachusetts Institute of Technology, 20 Ames Street #E15-305, Cambridge, MA 02139, USA, Copyright ACM 1999, pp. 65-68.

Giridharan Iyengar, et al., "Models for automatic classification of video sequences," SPIE vol. 3312, 1997, pp. 216-227.

Nevenka Dimitrova, et al., "Motion Recovery for Video Content Classification," ACM Transactions on Information Systems, vol. 13, No. 4, Oct. 1995, pp. 408-439.

DDL Group, "MPEG-7 Description Definition Language Document V 2," ISO/IEC JTC1/SC29/WG11/N2997, Oct. 1999/Melbourne, 56 pages.

Description Scheme Group, "MPEG-7 Description Schemes (V0.5)," ISO/IEC JTC1/SC29/WG11 N2844, MPEG 99, Jul. 1999, Vancouver, pp. 1-59.

Description Scheme Group, "MPEG-7 Generic AV Description Schemes (V0.7)," MPEG 99, Oct. 1999, Melbourne.

AHG on MPEG7 Media/Meta DSs and Harmonization with other Schemes, "MPEG-7 Media/Meta DSs upgrade (V0.2)," ISO/IEC JTC1/SC29/WG11 MXXXX, MPEG 99 Oct. 1999, Melbourne, pp. 1-17.

Peter Van Beek, et al, Editors, "MPEG-7 Multimedia Description Schemes WD (Version 3.0)," ISO/IEC JTC 1/SC 29/WG 11/N3411, May 2000, Geneva.

Peter Van Beek, et al., Editors, "MPEG-7 Multimedia Description Schemes XM (Version 3.0)," ISO/IEC JTC 1/SC29/WG 11/N3410, May 2000, Geneva.

P. Van Beek et al., "MPEG-7 Requirements for Description of Users," ISO/IEC JTC1/SC29/WG11, MPEG99/4601, Mar. 1999, 5 pages.

F. Pereira, Editor, "MPEG-7 Requirements Document V.9," ISO/IEC JTC1/SC29/WG11/N2859, Jul. 1999/Vancouver (Canada).

Sylvie Jeannin, et al., Editors, "MPEG-7 Visual part of eXperimentation Model Version 6.0," ISO/IEC JTC1/SC29/WG11/N3398, Geneva, Jun. 2000.

Jane Hunter (Dstc Pty Ltd.), "Text of ISO/IEC CD 15938-2 Information technology—Multimedia content description interface—Part 2 Description definition language," ISO/IEC JTC1/SC29/WG11 N3702, MPEG 00/3702, Oct. 2000 (La Baule).

"Information Technology—Multimedia Content Description Interface—Part 5: Multimedia Description Schemes," ISO/IEC JTC 1/SS 29 N 3705, Nov. 17, 2000, ISO/IEC CD 15938-5.

Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.

Yao Wang, et al., "Multimedia Content Analysis," IEEE Signal Processing Magazine, Nov. 2000, pp. 12-35.

Shinichi Satoh, et al., "Name-It: Association of Face and Name in Video," School of Computer Science, Carnegie Mellon University, Pittsburgh, PA 15213, Dec. 20, 1996, 19 pages.

Stuart J. Golin, "New metric to detect wipes and other gradual transitions in . . . " Part of the IS&T/SPIE Conference on Visual communications and Image Processing '99, San Jose, CA Jan. 1999, SPIE vol. 3653, pp. 1464-1474.

Ullas Gargi, et al., "Transactions Letters: Performance Characterization of Video-Shot-Change Detection Methods," IEEE Transactions on Circuits and Systems for Video Technology, vol. 10, No. 1, Feb. 2000, 13 pages.

Michael Ehrmantraut, et al., "The Personal Electronic Program guide—Towards the Pre-selection of Individual TV Programs," 1996 ACM, pp. 243-250.

Marc Light, et al., "Personalized Multimedia Information Access," Communications of the ACM, vol. 45, No. 5, May 2002, pp. 54-59.

Kyoungro Yoon, et al., "Proposal of Usage History DS," ISO/IEC JTC1/SC29/WG11, MPEG00/M6259, Jul. 2000, Beijing.

Boon-Lock Yeo, et al., "Retrieving and Visualizing Video," Communications of the ACM, Dec. 1997, vol. 40, No. 12, pp. 43-52.

H.B. Lu, et al., "Robust Gradual Scene Change Detection," Proceedings of IEEE International Conference on Image Processing, Kobe, Japan, 1999, 5 pages.

Richard J. Qian, et al., "A Robust Real-Time Face Tracking Algorithm," Sharp Laboratories of America, 5750 N.W. Pacific Rim Blvd., Camas, WA 98607, 1998 IEEE, pp. 131-135.

Lexing Lie, "Segmentation and Event Detection in Soccer Audio," EE 6820 Project, Soccer Audio, May 15, 2001, 9 pages.

Riccardo Leonardi, et al., "Content-Based Multimedia Indexing and Retrieval: Semantic Indexing of Multimedia Documents," IEEE 2002, pp. 44-51.

R. W. Picard, "A Society of Models for Video and Image Libraries," IBM Systems Journal, vol. 35, Nos. 3 & 4, 1996, pp. 292-312.

Alberto Del Bimbo, et al., "A Spatial Logic for Symbolic Description of Image Contents," Journal of Visual Languages and Computing (1994) 5, pp. 267-286.

Jin-Soo Lee, et al. Editors, "Specification of The UsageHistory DS," ISO/IEC JTC 1/SC 29/WG 11/M5748, Mar. 2000, Noordwijkerhout, pp. 1-6.

B. S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol. PAMI-2, No. 3, May 1980, pp. 204-222.

Noboru Babaguchi, "Towards Abstracting Sports Video by Highlights," ISIR, Osaka University, Ibaraki, Osaka 567-0047, Japan, 2000 IEEE, pp. 1519-1522.

Lawrence R. Rabiner, "A Tutorial on Hidden Markov Models and Selected Applications in Speech Recognition," Proceedings of the IEEE, vol. 77, No. 2, Feb. 1989, pp. 257-286.

Jim Stroud, "TV Personalization: A Key Component of Interactive TV," The Carmel Group, 2001, 9 pages.

Richard O. Duda et al., "Use of the Hough Transformation To Detect Lines and Curves in Pictures," Communications of the ACM, Jan. 1972, vol. 15, No. 1, pp. 11-15.

Rainer Lienhart, et al., "Video Abstracting," Communications of the ACM, Dec. 1997/ vol. 40, No. 12, pp. 55-62.

Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.

Daniel Dementhon, et al., "Video summarization by Curve Simplification," Language and Media Processing (LAMP), University of Maryland, College Park, MD 20742-3275, 1998 ACM, pp. 211-218.

Chung-Lin Huang, et al., "Video summarization using Hidden Markov Model," Electrical Engineering Department, National Tsing-Hua University, Hsin-Chu, Taiwan, ROC, 2001 IEEE, pp. 473-477.

Yihong Gong, et al., "Video Summarization Using Singular Value Decomposition," C&C Research laboratories, NEc USA, Inc. 110 Rio Robles, San Jose, CA 95134, USA, 2000 IEEE, 7 pages.

Yihong Gong, et al., "Video Summarization with Minimal Visual Content Redundancies," C&C Research Laboratories, NEC USA, Inc., 110 Rio robles, San Jose, CA 95134, USA, 2001 IEEE, pp. 362-365.

Minerva M. Yeung, et al., "Video visualization for Compact Presentation and Fast Browsing of Pictorial Content," IEEE Transactions on circuits and Systems for Video Technology, vol. 7, No. 5, Oct. 1997, pp. 771-785.

Stephen S. Intille, et al., "Visual Tracking Using closed-Worlds,", MIT Media Laboratory Perceptual computing Section Technical Report No. 294, Nov. 1994, pp. 1-18.

Leszek Cieplinski, et al. "Visual Working Draft 3.0," ISO/IEC JTC1/SC29/WG11/N3399, Jun. 2000 (Geneva), 92 pages.

David Beech, et al., editors, "XML Schema Part 1: Structures," http://www.w3.org/1999/05/06-xmlschema-1/, W3C Working Draft, May 6, 1997, 67 pages.

Paul V. Birch, et al., editors, "XML Schema Part 2: Datatypes, World Wide Web Consortium Working Draft," May 6, 1999, http://www.w3.orq/1999/05/06-xmlschema-2/ 37 pages.

Yuichi Yagawa et al., "TV Program Planning Agent using Analysis Method of User's Taste", Technical report of IEICE, vol. 98, No. 437, A198-54-61, Dec. 1, 1998.

* cited by examiner

LOGO TEMPLATE

GENERAL LOGO TEMPLATE IDENTIFICATION $$n = (y_1 - y_2 + 1)(x_1 - x_2 + 1)$$

$$VT_R = \frac{1}{n}\sum_{y=y_1}^{y_2}\sum_{x=x_1}^{x_2}(tmpt_R(x,y))^2 - \frac{1}{n^2}\left(\sum_{y=y_1}^{y_2}\sum_{x=x_1}^{x_2} tmpt_R(x,y)\right)^2$$

$$VI_R = \frac{1}{n}\sum_{y=y_1}^{y_2}\sum_{x=x_1}^{x_2}(I_R(x,y))^2 - \frac{1}{n^2}\left(\sum_{y=y_1}^{y_2}\sum_{x=x_1}^{x_2} I_R(x,y)\right)^2$$

$$coff_R = \frac{\frac{1}{n}\sum_{y=y_1}^{y_2}\sum_{x=x_1}^{x_2} tmpt_R(x,y)\,I_R(x,y) - \frac{1}{n^2}\sum_{y=y_1}^{y_2}\sum_{x=x_1}^{x_2} tmpt_R(x,y)\sum_{y=y_1}^{y_2}\sum_{x=x_1}^{x_2} I_R(x,y)}{\sqrt{VT_R\,VI_R}}$$

FIG. 22

IDENTIFICATION OF REPLAY SEGMENTS

CROSS-REFERENCE TO RELATED APPLICATIONS

This application is a division of U.S. patent application Ser. No. 10/259,367, filed Sep. 27, 2002 now U.S. Pat. No. 7,474,698, which claims the benefit of U.S. Provisional App. No. 60/345,001, filed Oct. 19, 2001.

BACKGROUND OF THE INVENTION

The present invention primarily relates to replay detection techniques.

The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are two major approaches to video summarization. The first approach for video summarization is key frame detection. Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames. Key frame techniques are especially suitable for indexing video content but are not especially suitable for summarizing sporting content.

The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries".

Babaguchi et al. propose a technique to link live and replay scenes in American football broadcast video. The replay scenes are detected by the sandwiching of digital video effects (DVEs) on either side of the replay segment. Babaguchi et al. note that it is impossible to design a general detector applicable to all DVEs, because there are a considerable number of DVE patterns that appear in everyday broadcasts. The DVE effect taught by Babaguchi et al. is a gradual shot change operation related to spatial aspects. The linking of live and replay scenes is performed based upon the dominant color of the key frame and the ratio of the number of vertical lines to that of horizontal lines on the field, which is representative of the camera angle. In effect, Babaguchi et al. detect replay segments by detecting special transition effects, by the manipulation of two natural scenes from the game, usually as a unique type of wipe. The technique for linking using the technique taught by Babaguchi et al., namely using the ratio, is suitable for the intended application, namely, American Football. In addition, the use of motion vectors and segmented spatial regions are inherently unreliable, and the technique can not automatically detect the transitions if the features of the transitions are not previously known.

Pan et al. propose a technique to detect slow-motion replay segments in sports video for highlights generation. The technique localizes semantically important events in sport programs by detecting slow motion replays of these events, and then generates highlights of these events at multiple levels. A hidden Markov model is used to model slow motion replays, and an inference algorithm computes the probability of a slow motion replay segment, and localizes the boundaries of the segment as well. The technique characterizes the pattern of slow motion as discontinuity on pixel wise intensity-based differences of adjacent frames that could be described by three features, and characterizes boundaries of replays segments as another feature: video-evolution ratio that is extracted from color histograms. The hidden-Markov model is applied to make the final decision on slow motion and the boundary of segments containing slow motion replay. However, the technique taught by Pan et al. is limited only to the detection of slow motion replay segments. The system taught by Pan et al. is unable to detect replay segments that are played back at the regular video rate, which are common in sports broadcast.

What is desired, therefore, is a robust replay detection technique.

BRIEF DESCRIPTION OF THE DRAWINGS

FIG. 22 shows an input image at the scoreboard area.

DETAILED DESCRIPTION OF THE PREFERRED EMBODIMENT

Figure 1:
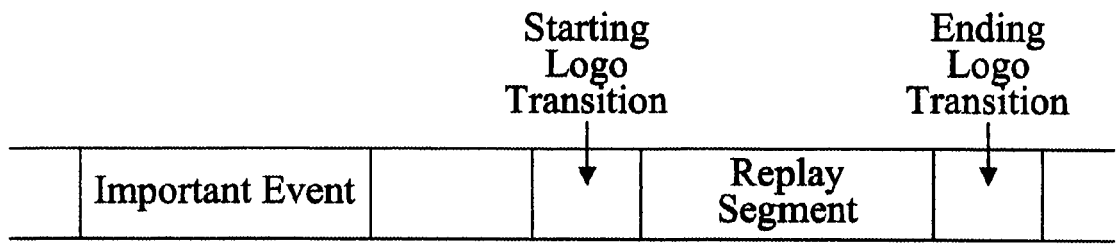
FIG. 1 illustrates a starting logo transition, a replay segment, and an ending logo transition, all after an important event.

It is conceivably possible to develop highly sophisticated models of a typical sports video to identify potentially relevant portions of the video, and many attempts have been made. However, such highly sophisticated models are difficult to create and are not normally robust. Further, the likelihood that a majority of the highly relevant portions of the video will be included in such a video summarization is low because of the selectivity of the model. Thus the resulting video summarization of the video may simply be unsatisfactory to the average viewer.

After consideration of the difficulty of developing highly sophisticated models of a sports based video to analyze the content of the sporting events, as the sole basis upon which to create a summarization, the present inventors determined that this technique is ultimately flawed as the models will likely never be sufficiently robust to detect all the desirable content. Moreover, the number of different types of model sequences of potentially desirable content is difficult to quantify. In contrast to attempting to detect particular model sequences, the present inventors determined that the desirable segments of a sporting event are preferably selected based upon characteristics of the broadcast video. The characteristics of the broadcast video which the present inventors identified as providing an indication of an exciting portion of the sporting event is the "replay". Furthermore, the present inventors determined that the "replay" within sporting activities may be identified based upon the presentation by the broadcaster of a logo, together with any special effects if any, during the transition between the "live" and the "replay" events. Frequently the logos include trademarks or otherwise a consistent image (albeit perhaps changing during the transition) provided by the broadcaster, and are used while phasing in and out of the replay segments, because the viewer typically prefers a replay with some sort of transition to signal the replay to the viewer. These may be referred to as "logo transitions" merely for purposes of identification. Also, the logo transitions typically remain the same at least for an entire game, or portion thereof, if not for an entire season.

The logos used for transitions are normally specific to the broadcaster. Such logos are typically graphical in nature and are independent of the corresponding visual content being displayed. Therefore, the logo will not typically change depending on the type of content that is being displayed. Most broadcasters do not vary the logo within a particular sporting activity and they tend to use the same logo at least for an entire season. Therefore, it is feasible to efficiently and robustly model transitions that sandwich replay segments on the basis of the features of the logo and identify replay segments by detecting the logos. The logo detection system may be manual with the logo being identified in some manner or otherwise provided, or fully automatic without the need to know the actual logo a priori where the logos are learned in an unsupervised manner.

The summarization of video may be based upon identifying replay segments. Then a modified video stream may be created based upon the identification of the replays. The modified stream may include the replays without additional material there between, or may include additional video material between the replay segments. In any case, the resulting video stream is of a shorter duration than the original video stream, or otherwise the replay segments are temporally spaced closer together in the modified video stream. Moreover, the modified video stream may be a set of pointers to the original video stream indicating those portions of the original video stream that comprise the summarization, while avoiding the need to actually modify the video stream itself.

Overview of a Replay Structure

A replay segment in sport programs, as depicted in FIG. 1 typically contains different types of frame/fields: a starting logo transition, a replay segment, and an ending logo transition, all of which typically follows an important event. The starting logo transition and the ending logo transition sandwich (with or without intervening frames) the replay segment. In many cases it may be observed that replay segments utilize slow motion effects to make a stronger visual impact, by repeating the fields, playing back fields captured by high-speed motion cameras at regular play back speed (effectively slow motion), etc.

Figure 2:
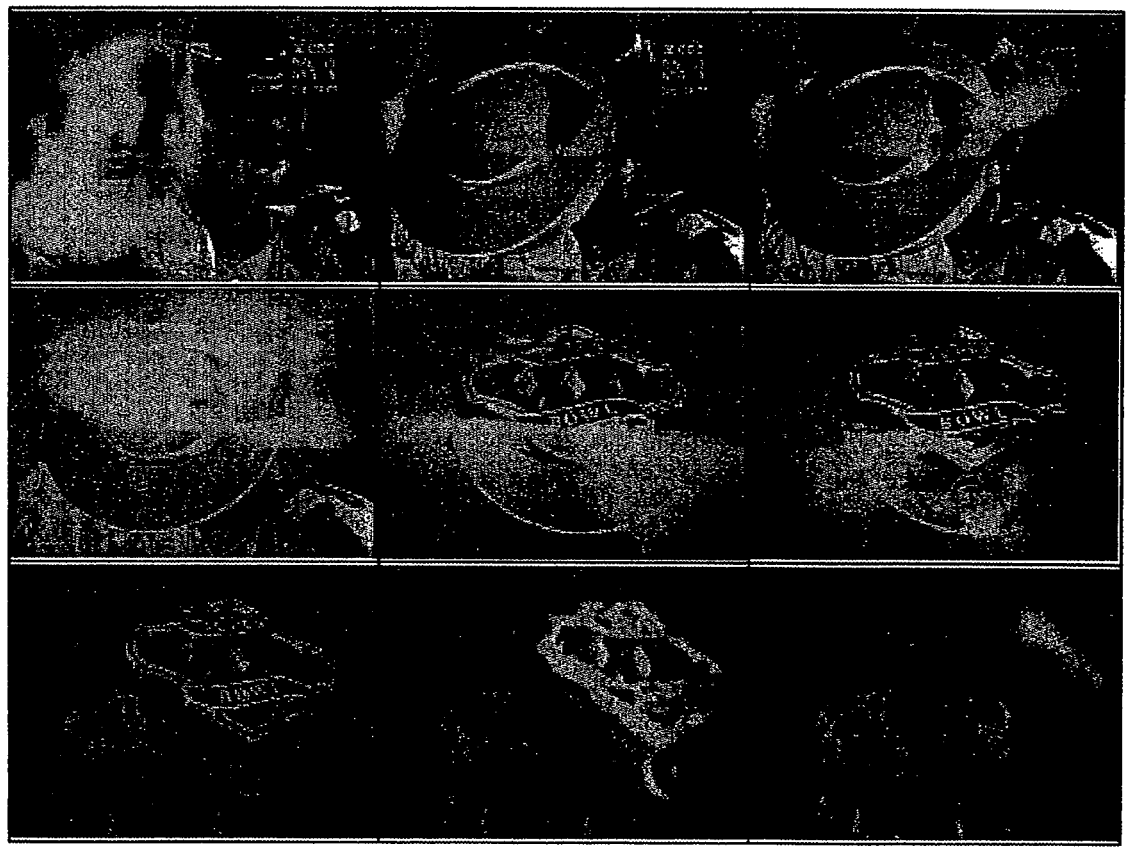
FIG. 2 illustrates a starting logo transition in the CBS 2000 Super Bowl broadcast, containing the CBS logo and the Super Bowl logo.
Figure 3:
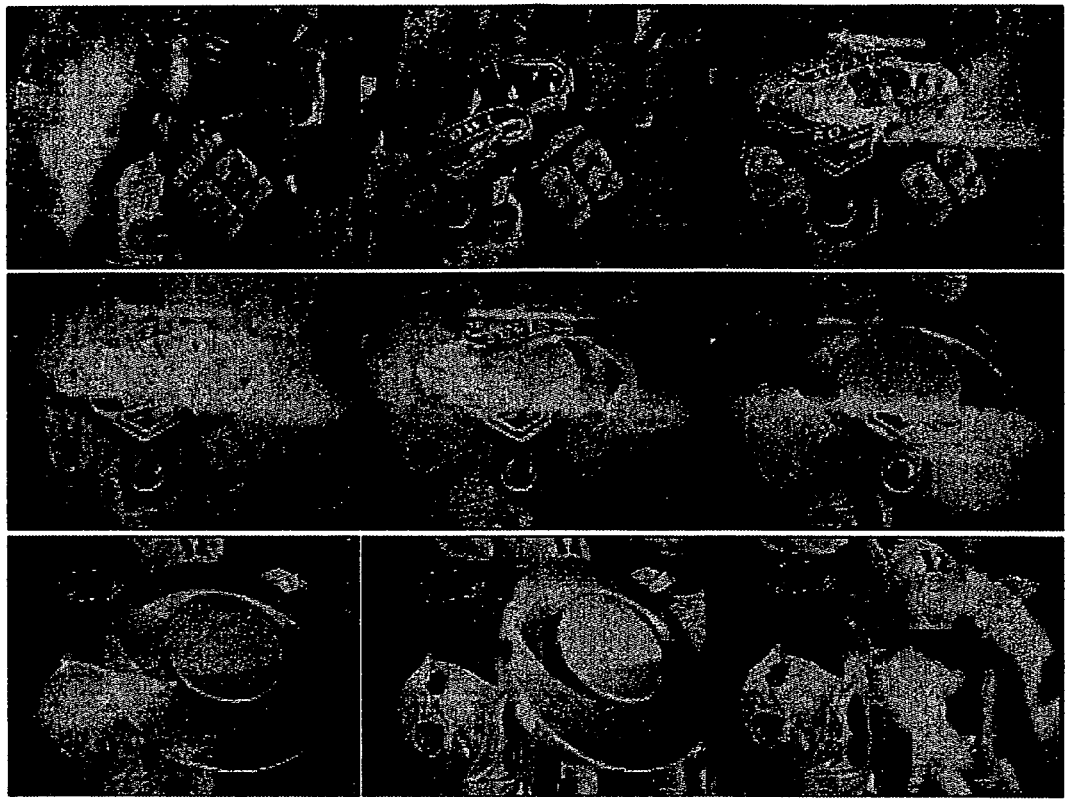
FIG. 3 illustrates an ending logo transition in the CBS 2000 Super Bowl broadcast, containing the CBS logo and the Super Bowl logo.

The starting logo transition and the ending logo transitions marking the start and the end of replay segments, respectively, typically comprise a gradual transition incorporating a fade in and out, cross/additive-dissolve and wipes, and contain the logo(s) of the broadcaster or a special event. Normally the length of a logo transition is about 1 second. By way of illustration, a starting logo transition in the CBS 2000 Super Bowl broadcast, containing the CBS logo and the Super Bowl logo, is shown in FIG. 2. An ending logo transition in the CBS 2000 Super Bowl broadcast, containing the CBS logo and the Super Bowl logo, is shown in FIG. 3. It may be observed that the logo's position on the frames, the color of the logo, the shape of the logo, and/or the size of the logo change during the transition. The logos, even at their full size, usually occupy only a part of an entire frame. Also, the background in a logo transition gradually changes from one content to another.

It may be observed that a logo transition contains a set of consecutive frames each of which includes an image of the logo, albeit with a slightly different appearance. In some cases, the logo will not change appearance and/or location during the transition. It is normally sufficient to select one frame with a distinguishable logo as a logo template to represent the starting or ending logo transition. In some cases, a logo image may be obtained from a source other than the video or otherwise based upon multiple frames, as desired. In addition, the logo template is preferably represented as an image, but may likewise be represented by other characteristics, such as for example, a set of textures, a set of image edges, a color pattern, dynamic features across frames (such as motion vectors and "flying" patterns of the logo), a set of discrete cosine transform coefficients, etc., all generally referred to as image characteristics.

Figure 4:
FIG. 4 illustrates logo identification.

Referring again to FIG. 2, the logo in any of the seven middle frames of the starting logo transition (excluding the first and last) are particularly suitable for the selection of a corresponding logo. Referring to FIG. 4, the frames of the transitions contain "unique" logos and which may serve as a template. In the basic case, merely the logo image characteristics are identified and serve as the complete logo template. However, the present inventors have determined that the resulting logo template is more robust if the size of the logo is specified, the color of the logo, the shape of the logo, and/or the position of the logo on the frame, because the background of different logo transitions show different content, while the same logo is reused in the same manner. The same process is likewise applicable to the ending logo transition, as illustrated in FIG. 3.

Overview of Automated Summarization

Figure 5:
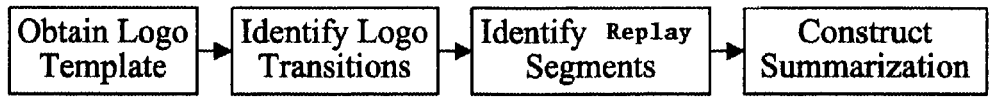
FIG. 5 illustrates summarization based upon logo transitions.

While the selection of the logo may performed manually or otherwise obtained, the system preferably identifies a logo template, which may include the logo image, the logo size, the logo color, the logo shape, and/or the logo position, in an unsupervised fashion free from user input, as illustrated in FIG. 5. Based upon the identified logo template(s) the logo transitions within the video are identified. The replay segments are identified based upon the identified logo transitions. With the replay segments identified the summarization may be constructed in a suitable manner.

Figure 6:
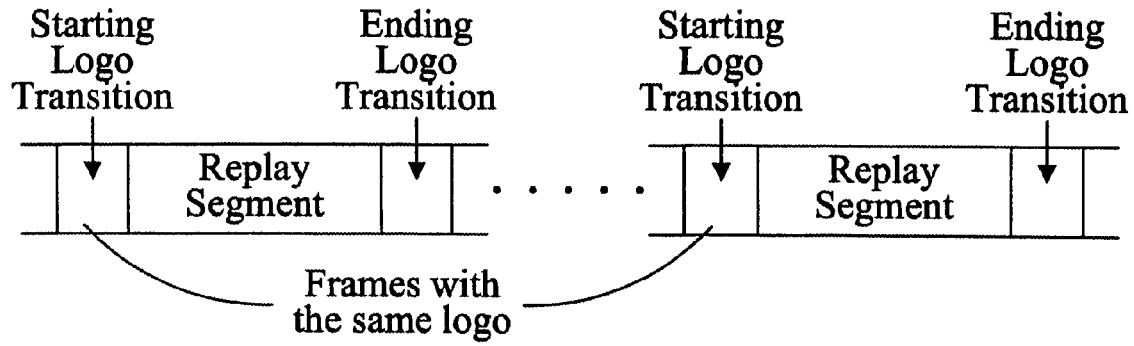
FIG. 6 illustrates multiple logo transitions.

Identifying the logo template for the starting or ending logo transition is preferably based upon the same structure, namely, the color logo image with a consistent size and shape at a consistent spatial region in the frame. Except for the logo, the image content of a logo transition is arbitrarily different as they are usually spaced apart by at least several hundreds of frames, as depicted in FIG. 6.

General Automated Logo Detection System

One automated technique to identify a logo template is to directly find frames with the same logo(s) in a long sporting program. However, there are typically many frames in the video that are very similar but are not related to logo transitions, such as totally black or white frames within commercial segments. While potentially feasible, and within the scope of the invention, the direct searching technique is difficult and computationally expensive.

Another automated technique to identify a logo template is to directly search for logos that occur only in certain portions of a frame. While this may reduce the search field, and within the scope of the invention, this restricted direct searching technique is still difficult and computationally expensive.

Figure 7:
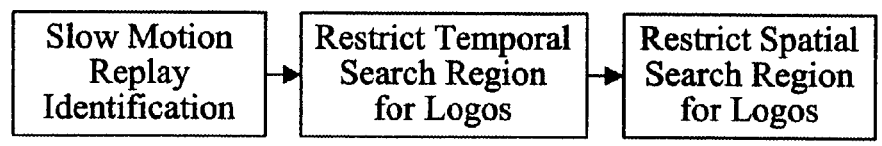
FIG. 7 illustrates general logo template identification.

Referring to FIG. 7, to reduce the computational complexity of the system and reduce the likelihood of identifying a false logo template, a preferred technique involves using the slow-motion replay segment detection technique taught by Pan et al. entitled Detection Of Slow-Motion Replay Segments In Sports Video For Highlights Generation, Proceedings of International Conference on Acoustic, Speech and Signal Processing (ICASSP), 2001. This technique provides an indication of those portions of the video that are likely to contain replay segments, albeit slow-motion replay segments. The search region for logos is then primarily restricted to regions surrounding the slow-motion replay segments, such as within a few hundred frames (i.e., before and after) (e.g., less than +−1000 frames).

Figure 8:
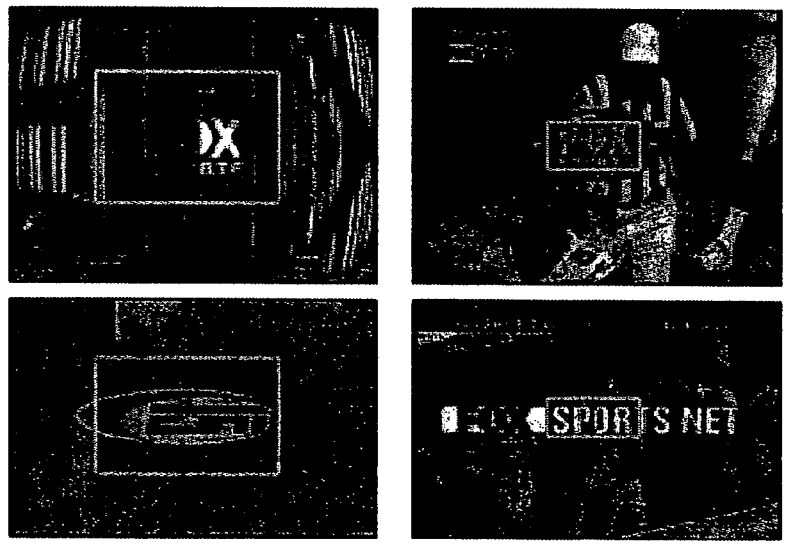
FIG. 8 illustrates multiple logo search areas.

While temporal restriction of the search region is typically sufficient, the logos normally appear within the same general spatial region of the frame, such as the central portion of the frame. This consistent presentation of the logo may be as a result of the broadcast provider's desire to have their logo readily observed by the viewer. A spatial search region within the central portion of the frame, such as a square or rectangle, may be used for logo template identification. The search region may be varied in size, as desired. The best logo template for a particular logo image may be defined by a search region (for a given spatial region) having the greatest amount of the logo contained therein with the least corresponding background. FIG. 8 illustrates two logo search regions, both of which are centrally located within the frame.

Specific Automated Logo Detection System

Figure 9:
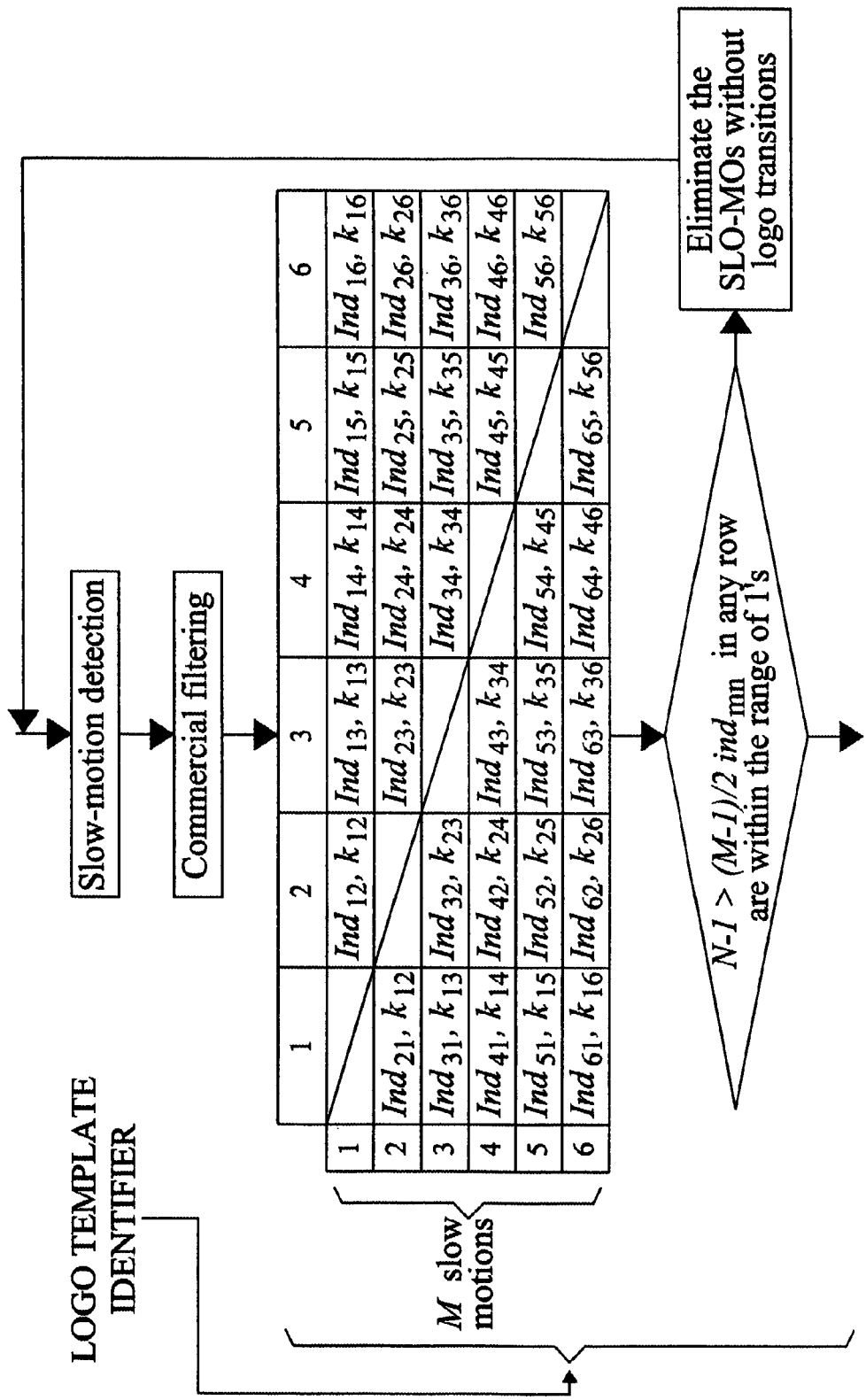
FIG. 9 is a flow diagram showing the components of unsupervised detection of the logo template.

Referring to FIG. 9, a more detailed system for the unsupervised identification of a logo template is illustrated. A slow motion detector detects slow motion replays. One suitable slow motion replay detector detects discontinuity in pixel wise intensity-based differences of adjacent frames, and uses forward and backward hidden Markov Models to detect the boundaries of slow motion segments. See, Pan et al. entitled Detection Of Slow-Motion Replay Segments In Sports Video For Highlights Generation, Proceedings of International Conference on Acoustic, Speech and Signal Processing (ICASSP), 2001.

The slow motion replay segments may be contained within a commercial. Accordingly, such slow motion segments contained within commercial segments are eliminated as potential candidates for logo template identification. A suitable commercial filter is disclosed by Pan et al. in a paper entitled Detection Of Slow-Motion Replay Segments In Sports Video For Highlights Generation, Proceedings of International Conference on Acoustic, Speech and Signal Processing (ICASSP), 2001.

With the slow-motion replays detected and the commercials filtered a logo template identification is performed, as described below.

Logo Template Identification

After commercial filtering, the logo template identifier preferably uses M slow motion segments (M>2). A logo template may be determined from just 2 slow motion segments. Specifically, the system first detects two most similar frames and areas in two sets of a few hundreds frames that surround the two slow motion segments. The most similar frames and areas are potentially identified as the logo frames and logo areas, which for purposes of discussion may be referred to as the "2-Slow-Motion Segments algorithm". The system then uses the detected logo frame as a template to detect the rest of the logo frames in a sports video.

In practice, however, the logo template identified based only by two slow-motion segments is potentially unreliable due to the following reasons:

(a) the slow-motion segments algorithm is not 100% reliable (one or both slow-motion segments may not be true slow motion segments), (b) the commercial filtering algorithm is not 100% reliable (a commercial slow motion segment does not have logo frames), and (c) the 2 slow-motion segments algorithm itself is also not 100% reliable.

Therefore a M-Slow Motion Segment detection algorithm increases the reliability. Such a technique uses slow-motion M−1 detected logo frames and logo areas by pairing with M−1 other slow-motion segments and repeatedly running the 2-slow-motion segments algorithm M−1 times. This "M−1 to 1" redundancy helps ensures the robustness and accuracy of the algorithm.

Overall Slow Motion Segment Discussion

The 2-slow-motion segments algorithm will be discussed which is then extended to the M-slow-motion segments algorithm, and the distance measurements. An example result of the 2-slow-motion segments algorithm is illustrated. Then a table is presented that slows a MXM table that is used to organize the results from different pairs of slow-motion segments. Finally a discussion of the criteria of choosing a logo template from multiple detected logo frames is presented.

2 and M-Slow-Motion Segment Techniques

The 2-slow motion segment technique, which is then expanded for the M-slow motion segments technique may include the following steps:

(1) Take $L_1$ frames before and $L_2$ frames after their starting point frames of slow-motion m and slow-motion n (m≠n) to build two queues of frames, $Q_m$ and $Q_n$, respectively. Define K possible rectangular logo areas located at the center of a frame.

(2) Pick any frame i from $Q_m$ and frame j from $Q_n$. Calculate the distance $d^{(k)}(i, j)$ of the area k in frame i and j.

(3) Find logo frames $ind_{mn}$ in $Q_m$ and $ind_{nm}$ in $Q_n$, respectively, and the logo area $k_{mn}$ by finding the minimum distance $d_{mn}$ among all possible $d^{(k)}(i, j)$ as:

$$ind_{mn}, ind_{nm}, k_{mn}, d_{mn} = \arg\min(d_{i,j,k}^{(k)}(i,j))\ i \in Q_m, j \in Q_n,$$
$$k=0, 1, \ldots K-1$$

Figure 10:
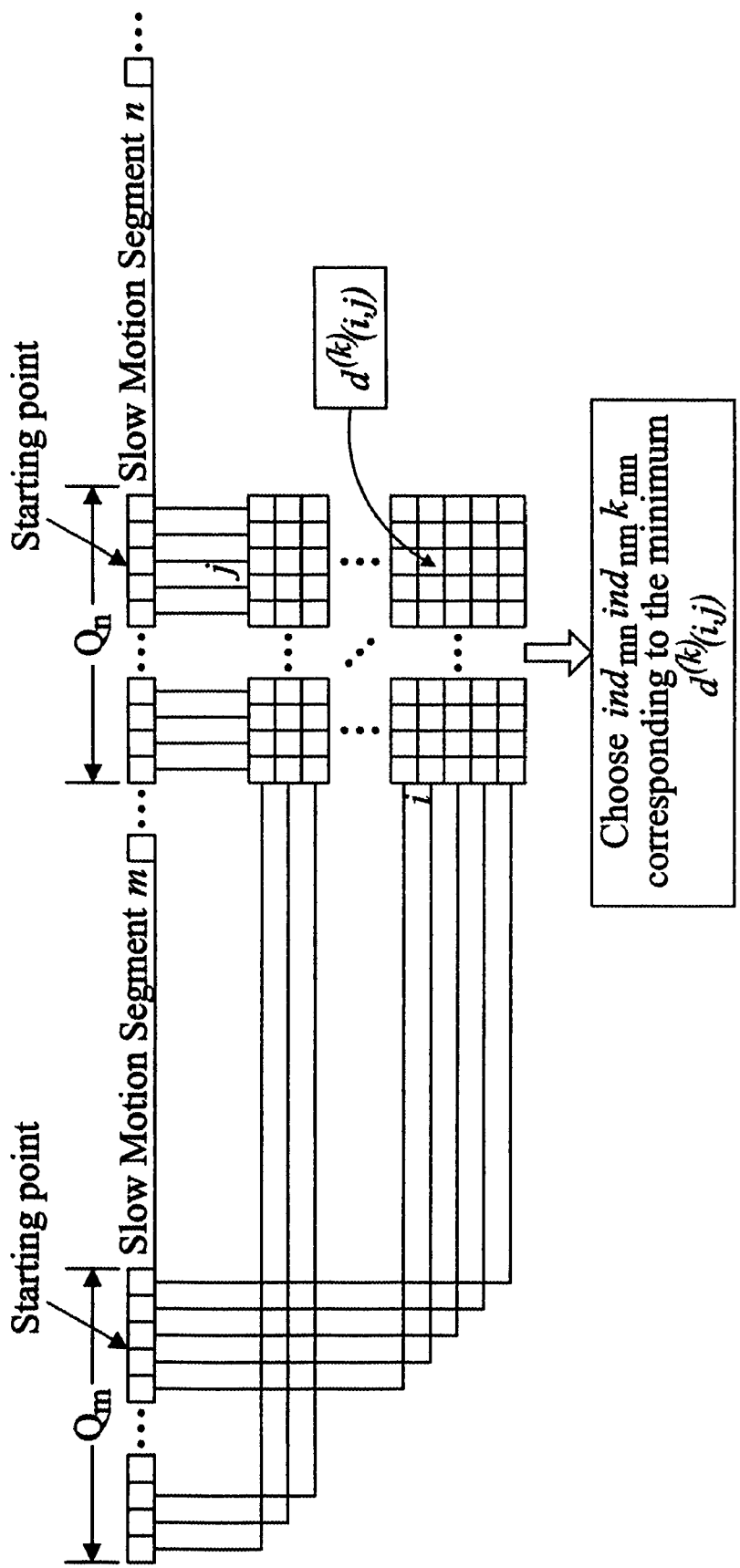
FIG. 10 illustrates a 2-slow motion technique.

This concept is illustrated in FIG. 10.

Related Distance Measurements

The distance $d^{(k)}(i, j)$, may be defined as $$d^{(k)}(i,j) = \beta d^{(k)P}(i,j) + (1-\beta) d^{(k)H}(i,j),$$

where $0 < \beta < 1$ is the weight, $d^{(k)P}(i, j)$ is the pixel wise intensity-based mean-square difference (MSD), and $d^{(k)H}(i, j)$ is the color histogram-based MSD. Pixel wise intensity-based MSD may be defined as:

$$d^{(k)P}(i,j) = \frac{1}{N^{(k)}} \sum_{n \in area\, k} |I(n, i) - I(n, j)|^2$$

where I(n, i) is the intensity of the pixel with index n in frame i, and $N^{(k)}$ are the size of area k. Because of this normalization, $d^{(k)P}(i, j)$ may be independent from the size of area k. Color histogram-based MSD may be defined as:

$$d^{(k)H}(i,j) = \sum_l |H^{(k)}(l, i) - H^{(k)}(l, j)|^2$$

where $H^{(k)}(l, i)$ is the value of bin l in the color histogram of area k of frame i and is normalize so that $\Sigma_l H^{(k)}(l, i)=1$. $d^{(k)H}(i, j)$ may also be independent from the size of area k. The color space where $H^{(k)}(l, i)$ is calculated (RGB, HSV, or others), the number of bins, and the configuration of bins are chosen by considering various factors, such as computational cost. For example, one could choose the RGB space, 16 bins that are evenly distributed from 0 to 1 for the normalized R component, R/(R+G+B), and the normalized G component, G/(R+G+B), respectively.

The pixel wise intensity-based MSD $d^{(k)P}(i, j)$ captures structural information while the color histogram-based MSD $d^{(k)H}(i, j)$ captures color information. Nevertheless, the two MSDs have different ranges: $d^{(k)P}(i, j)$ could be as big as thousands, while $d^{(k)H}(i, j)$ usually is smaller than 1. Therefore, the weight b is chosen so that $d^{(k)P}(i, j)$ and $d^{(k)H}(i, j)$ make the same (or similar) contribution in $d^{(k)}(i, j)$.

Figure 11:
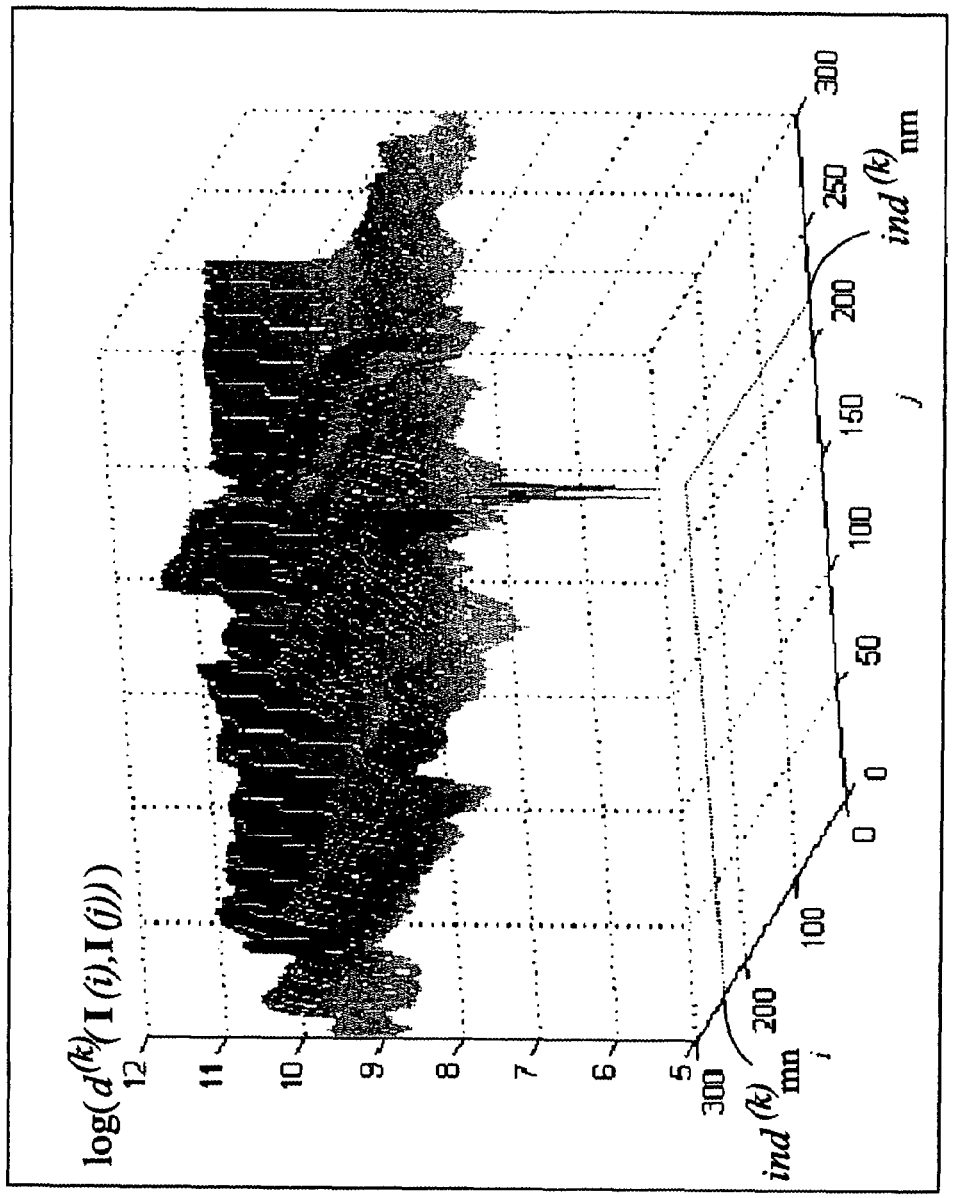
FIG. 11 illustrates a pair of slow motion detections.

A typical result obtained by the 2-slow motion segment algorithm is depicted in FIG. 11. FIG. 11 shows $d^{(k)}(i, j)$ computed for one rectangular area. The spike, which indicates the matching of multiple frames in the two logo transitions, is strong and easy to detect. The lowest value is designated as $d^{(k)}_{min}(i, j)$, its index in $Q_m$ as $ind^{(k)}_{mn}$, and in $Q_n$ as $ind^{(k)}_{nm}$. It is noted that $d^{(k)}_{min}(i, j)$ is the extreme distance for one rectangular area. The system preferably considers all the rectangular areas to find $d_{min}(i, j)$, $ind_{mn}$, $ind_{nm}$, and $k_{mn}$.

M×M Table of FIG. 9

Because each pair of slow motion segments creates two detected logo frames and areas, and M slow motion segments create M(M−1)/2 pairs, M slow motion segments have M(M−1) detected logo frames and areas. The detected results in an M×M table without the M diagonal elements, as shown in FIG. 9.

Cell (n, n) of the table is empty. Cell (m, n) (m≠n) contains $ind_{mn}$ and $k_{mn}$, the indexes of the logo frame and area, of slow motion segment m, which is obtained from slow motion segments m and n. Therefore, Row m of the table contains M−1 indexes of the logo frames in slow motion segment m. Cell (n, m) contains $ind_{nm}$ and $k_{nm}$, the indexes of the logo frame and area of slow motion segment n, which is also obtained from slow motion segments m and n ($k_{mn}=k_{mn}$). Therefore cells (m, n) and (n, m) are filled simultaneously, and the system may need to run the two slow motion segments algorithm M(M−1)/2 times.

Some of the M slow motion segments may not contain logo transitions. As a result, running the two-slow motion segments algorithm on them may at times generate false logo frames with big minimum distance $d_{mn}$. Therefore, when cells (m, n) and (n, m) are filled, the system may also checks the value of $d_{mn}$: Only if $d_{mn}$ is above a threshold should the two cells be left empty. This threshold may be determined empirically, for example.

The above threshold reduces the false logo frames with large minimum distance $d_{mn}$. To eliminate those false logo frames with small minimum distance $d_{mn}$, the system uses the fact that up to M−1 detected logo frames of one slow motion segment should be within the temporal distance range of approximately 1 second because logo transitions usually are shorter than 1 second. To exploit this temporal constraint, the system may take advantage of the M×M table in FIG. 9.

In the table, row m in the table contains M−1 indexes of the detected logo frames of slow motion segment m. If N of the M slow motion segments have the same logo transitions, then in the table, there are N−1 rows, each of which has N−1 detected temporally close logo frames. For example, if slow motion segments 1, 2, and 3 of the six slow motion segments have logo transitions, then each of rows 1, 2, and 3 have two close $ind_{mn}$, that is, the differences of $ind_{12}$ and $ind_{13}$, $ind_{21}$ and $ind_{23}$, and $ind_{31}$ and $ind_{32}$ are within approximately 1 second.

Criterion for Final Decision of Logo Template

To detect a "true" logo template, the system may consider the detection as a success when N, N>M/2, of M slow motion segments containing logo transitions and their logo frames have been correctly detected. Due to the noise or other factors, in practice, the system may not be able to find in the table N−1 rows, each of which contains N−1 temporally close logo frames. Therefore, a suitable relaxed criterion is that if in any row(s) of the table, N−1 logo frames are within the temporal distance of approximately 1 second, then the corresponding slow motion segment of the row contains a logo transition and these detected logo frames are true.

If the above criterion is satisfied, the system may then choose the logo template and logo area by finding minimum $d_{mn}$ associated with the "true" detected logo frames. If one minimum $d_{mn}$ is associated with two logo frames, and the system may randomly pick one of them as the logo template. If N<M, then the system may go back and replace those slow motion segments without two true logo frames with new slow motion segments and recalculate the table.

Logo Frame Detection Using Detected Logo Template

After the system detects the logo template and its area, the system uses these pieces of information to locate logo frames in the game in any suitable manner. In the preferred system, the system first calculates the distances between the detected logo template with every frame in the game using the two distance measurements: pixel wise intensity-based MSDs and color histogram-based MSDs. Assuming the independence of the two MSDs, the system may use two separate probability models for the two MSDs. From the two models, the system may then locate those potential logo frames with their a posteriori probabilities.

Pixel Wise Intensity-Based MSDs

Figure 12:
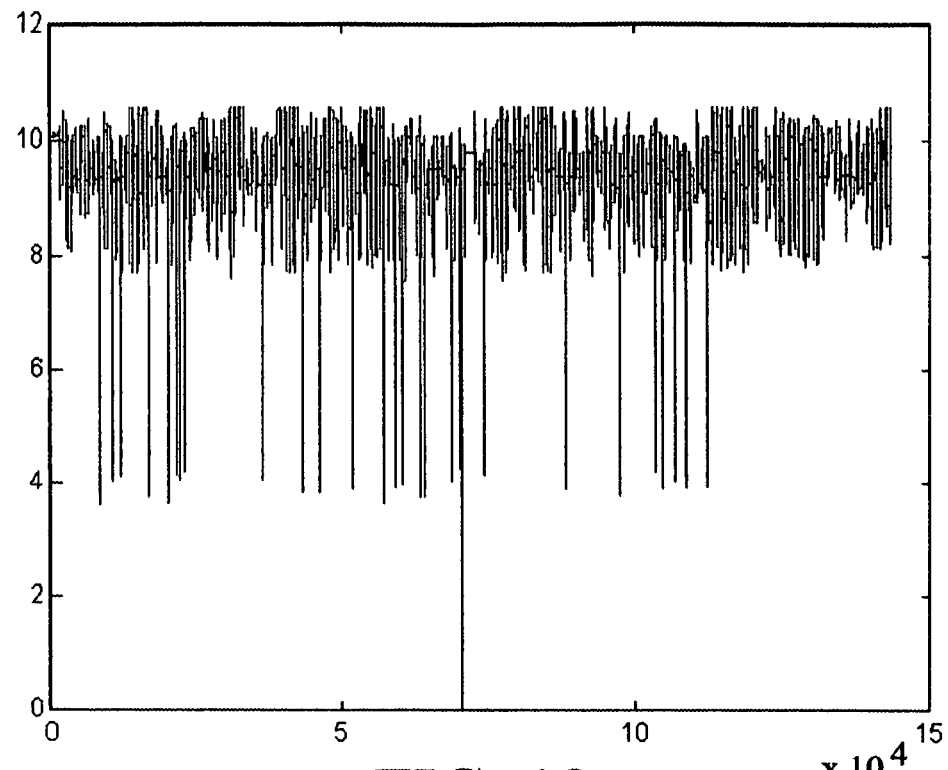
FIG. 12 illustrates pixelwise intensity-based MSDs using a frame index.

The system may designate $d^P(i)$ as pixel wise intensity-based MSDs, $$d^P(i) = \frac{1}{N} \sum_{n \in \text{logo area}} |I(n, i) - I_{logo}(n)|^2$$

where I(n, i) is the intensity of the pixel with index n in frame i, $I_{logo}(n)$ is the intensity of the pixel with index n in the logo frame, and N is the size of the logo area. One example of $\log(d^P(i))$ is shown in FIG. 12 indicating the logo frames.

To describe the pixel wise intensity-based MSDs using the probability language, two classes may be introduced: L represents the class of non-logo frames and Q represents the class of logo frames, and two probability densities associated with the two classes: $p^P(x|Q)$ and $p^P(x|P)$, where $x=\log(d^P(i))$. The logarithm of $d^P(i)$ is easy to model.

Figure 13:
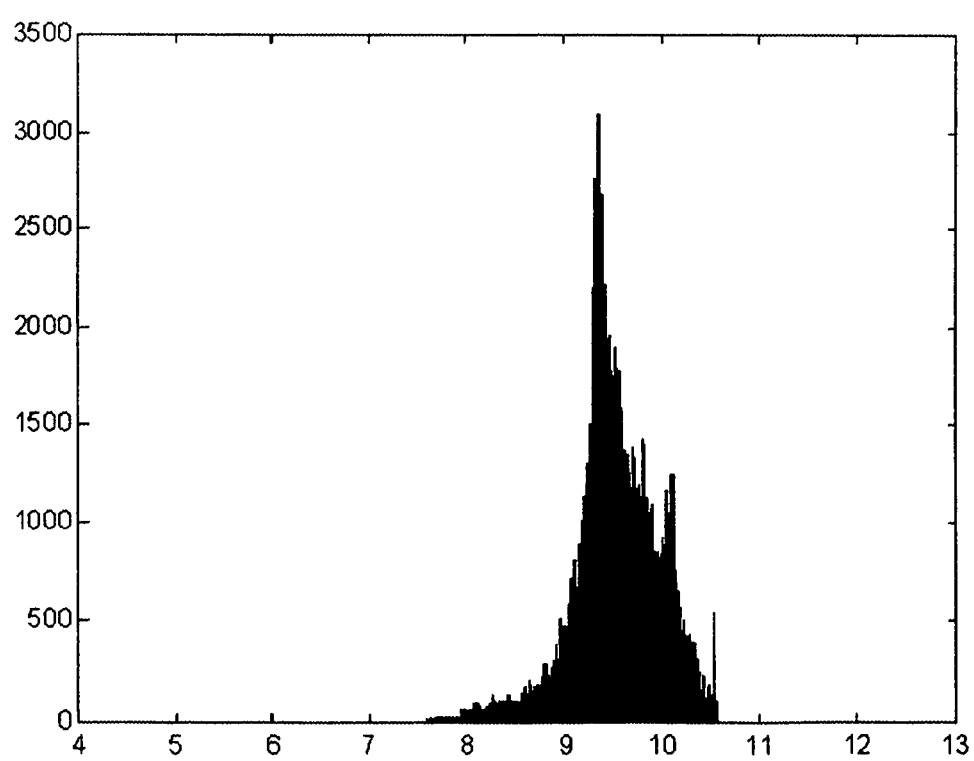
FIG. 13 illustrates pixelwise intensity-based MSDs using a histogram.

Probability density $p^P(x|Q)$, a probability describing non-logo frames, is modeled by a Gaussian distribution. The mean $m_p$ and covariance sp of $p^P(x|Q)$ are estimated by $\log(d^P(i))$ of all the frames including both logo and non-logo frames. Because the number of logo frames is much smaller than the number of non-logo frames, the estimation is reasonable. The histogram of $\log(d^P(i))$ is shown in FIG. 13 which has a rough shape of a Gaussian distribution.

Probability density $p^P(x|P)$, a probability describing non-logo frames, is difficult to estimate because logo frames are unknown and they are in small number. For the sake of simplicity, the system may assume that $p^P(x|P)$ is a uniform distribution between 0 and $x_0$, where $x_0$ denotes the threshold that separates the classes of logo and non-logo frames and its value is set to $m_p-2s_p$, as shown in FIGS. 12 and 13. Therefore, $p^P(x_0|P)=1/(m_p-2s_p)$.

Color Histogram-Based MSDs

The system may designate $d^H(i)$ as color histogram-based MSDs, $$d^H(i) = \sum_l |H^{(k)}(l, i) - H^{(k)}_{logo}(l)|^2$$

where $H^{(k)}(l, i)$ is the value of bin l in the normalized color histogram of logo area k of frame i and $H^{(k)}_{logo}(l)$ is for the logo template.

Figure 14:
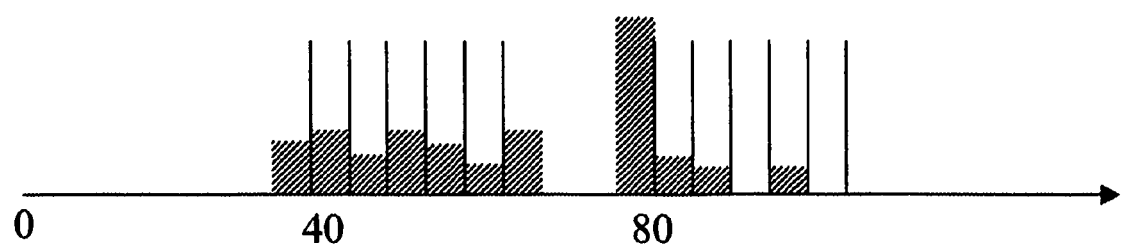
FIG. 14 illustrates two configuration of bins on one dimension of the color space.

Because the logo template typically has a small range of colors, it may be inefficient to uniformly distribute the color histogram bins over the entire color space. This is in contrast to the previous learning stage. To achieve the best results, when the number of bins is fixed, the position and the width of each bin should be adjusted to capture maximal color information in the logo template. To reduce the computational complexity, the system may set the widths of the bins in the following manner. The starting and the ending bins of every dimension of the color space have much wider and adjustable widths than the rest of the bins with fixed widths. When the width of the starting bin is adjusted, the system may also change the position (but not the width) of the rest of the bins, as shown in FIG. 14. Because colors are discrete, the possible widths of the starting bin are limited. All the possibilities may be tested, and for each one the system calculates:

$$enp_{logo} = \sum_l H^{((k))}_{logo}(l) \log(H^{(k)}(l))$$

and then picks the configuration that has the maximum $enp_{logo}$.

As the pixel wise intensity-based MSDs, the system may also introduce two probability densities: $p^H(y|Q)$ and $p^H(y|P)$, where $y=\log(d^H(i))$ to model color histogram-based MSDs. $p^H(y|Q)$ is Gaussian distribution with parameters $m_H$ and $s_H$, and $p^P(y|P)$ is the uniform distribution between 0 and $y_0$, where $y_0$ denotes the threshold that separates classes of logo and non-logo frames. The value of the threshold $y_0$ is set to be $m_H-2s_H$, Therefore, $p^H(y|p)=1/(m_H-2s_H)$.

The logo frames are detected by considering both MSDs. Specifically, to mark frame j as a logo frame, both $\log(d^P(i))$ and $\log(d^H(i))$ must be smaller than the thresholds $x_0$ and $y_0$, respectively. In other words, both MSDs need to recognize the frame as a logo frame. The corresponding a posteriori probability $p(P|d^P(j), d^H(j))$, which describes the reliability of the detected logo frame j, is calculated by the Bayes' rule in the probability theory under the assumption that $p(d^P(j), d^H(j) |P)=p(d^P(j)|P) p(d^H(j)|P)$.

The detected logo frames may not be identified as starting or ending logo transitions, although the system uses different starting and ending logo templates. Because of the similarities between the starting and the ending logo transitions, some starting logo frames may be identified as ending logo frames, and vice versa. On the other hand, because of the difference between starting and ending logo transitions of sports programs, if the system uses only one logo template for both starting and logo transitions, some logo frames may be missed.

Replay Segment Identification

After successfully detecting the logo transitions, the remaining task is to identify the replay segments. This is not a trivial task, as the logo transition detection algorithm may not necessarily differentiate between starting and ending logo transitions. In detecting the replay segments, a priori information on the lengths of replays provides useful information. Usually replays are 10-20 seconds long and the temporal distances between replays are much longer. Nevertheless, when exceptions happen, for example, replays are very long, or several replays are positioned back-to-back, using the information on the lengths of replays alone may not be enough.

To solve this problem, besides the a priori information on the lengths of replays, the system may once again use its previous slow motion detection algorithm Specifically, the system may use patterns of relationships between the detected logo frames and slow motion segments to guide the grouping of them into replays because a slow motion segment is typically sandwiched by two logo transitions.

The rest of this discussion discusses five patterns of the relationships between slow motion segments and logo frames, and a Rayleigh density function that may be used to model the duration of replays. Then a five-scan probabilistic inference algorithm groups the detected logo frames and slow motion segments into the five patterns of replays based on the probability of duration of replays and the a posteriori probabilities associated with detected logo frames.

Relationship Between Slow Motions and Logo Frames

Figure 15:
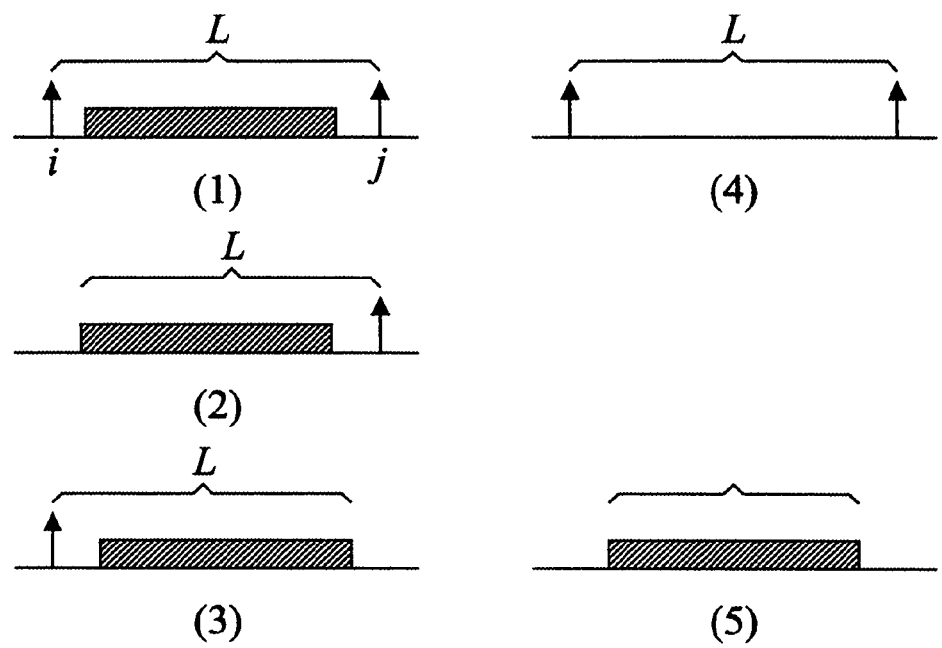
FIG. 15 illustrates relations between detected slow motions and logo frames.

A typically replay contains a slow motion segments and is sandwiched by starting and ending logo transitions. By way of example, as shown in FIG. 15, the system may use the following five patterns of the relationship between detected slow motion segments and logo frames:

(1) Two logo frames and one slow motion segment between them are detected.
(2) The end logo frame and one slow motion segment are detected.
(3) The starting logo frame and one slow motion segment are detected.
(4) Only two logo frames are detected without a slow motion segment.
(5) Only one slow motion segment without logo frames is detected.

When replays in the five patterns are back-to-back connected together, the system may use the following information on the duration of replays to separate them.

Duration of Replays

Figure 16:
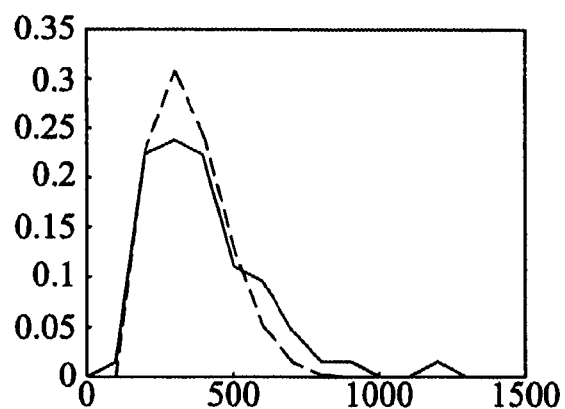
FIG. 16 illustrates a normalized histogram of the length of the replays (solid curve) and the Rayleigh distribution (dashed curve).

In sports programs, duration of replays can be well modeled by a Rayleigh distribution:

$$p(L \mid G) = \frac{L - L_0}{\sigma_L^2} \exp\left(-\frac{(L-L_0)^2}{2\sigma_L^2}\right) u(L - L_0)$$

where G represent the class of replays, L represents the duration a replay, $S_L$ is the covariance of L, and u(x) is the unit step, that is, $u(x)=1$ when $x \geq 0$; $u(x)=0$ when $x<0$. Because the duration of replays is normally longer than three seconds, the origin of the Rayleigh distribution is offset by $L_0=3$ seconds. FIG. 16 shows the comparison between the normalized histogram of 122 replays and the Rayleigh function with $S_L$ estimated from them.

Five Scan Probabilistic Inference Engine

The five patterns should not be determined simultaneously. For example, pattern 2 may wait until pattern 1 has been determined, because pattern 1 may be grouped into pattern 2 while pattern 2 does not have the risk of being grouped into pattern 1. Therefore, the system develops an algorithm that scans the detected slow motion segments and logo frames by 5 times. Each scan only groups some slow motion segments and logo frames into one pattern of replays.

The preferred order of the five scans in the algorithm is following

1. Scan 1 scans all the data to group two logo frames and one slow motion segment with the pattern 1;
2. Scan 2 scans all the ungroup data to group one frames and one slow motion segment with the pattern 2;
3. Scan 3 scans all the ungroup data to group one frames and one slow motion segment with the pattern 3;
4. Scan 4 scans all the ungroup data to group two logo frames with the pattern 4;
5. Scan 5 scans all the ungroup data to mark one slow motion segment with the pattern 5.

In the first four scans of the algorithm, a probability describing the confidence on the possible replays is inferred from the a posteriori probabilities of logo frames and the probability of replay duration p(L|G):

(1) For pattern 1 and 4 that have two logo frames: i and j, the probability is $p(L, G|d^P(i), d^H(i); d^P(j), d^H(i))$. This probability may be interpreted as given the pixel wise intensity-based and color histogram-based MSDs of two detected logo frames i and j: $(d^P(i), d_H(i))$ and $(d^P(j), d^H(j))$, the probability that this segment from frame i to j is a replay and the length is L.

If $p(L, G|d^P(i), d^H(i); d^P(j), d^H(j))$ exceeds an empirically chosen threshold, then the segment from frame i to j is a replay.

$p(L, G|d^P(i), d^H(i); d^P(j), d^H(j))$ is calculated from the a posteriori probabilities of logo frames and the probability of replay duration p(L|G). The following is the derivation.

The system knows that:

$$p(L, G|d^P(i), d^H(i); d^P(j), d^H(j)) = p(G|d^P(i), d^H(i); d^P(j), d^H(j)) p(L|G)$$

where $p(G|d^P(i), d^H(i); d^P(j), d^H(j))$, the probability that the segment is a replay given $(d^P(i), d^H(i))$ and $(d^P(j), d^H(j))$, is the same as $p(P|d^P(i), d^H(i); d^P(j), d^H(j))$, the probability that frames i and j are logo frames given $(d^P(i), d^H(i))$ and $(d^P(j), d^H(j))$. Because the MSDs of two frames are independent, the system further has:

$$p(P|d^P(i), d^H(i), d^P(j); d^H(j)) \approx p(P|d^P(j), d^H(j)) p(P|d^P(i), d^H(i))$$

where a is a normalization factor.

Finally, $$p(L, G|d^P(i), d^H(i); d^P(j), d^H(j)) \approx p(P|d^P(j), d^H(j)) p(P|d^P(i), d^H(i)) p(L|G).$$

(2) For pattern 2 and 3 that only have one logo frame: i, the probability is p(L, P|d$^P$(i), d$^H$(i)), which is interpreted as given the pixel wise intensity-based and color histogram-based MSD of the detected logo frames i: (d$^P$(i), d$^H$(i)), the probability that this segment is a replay and the length is L. Similarly, the system uses an empirically chosen threshold on p(L, P|d$^P$(i), d$^H$(i)) to decision. Following the same procedure above, the system obtains:

$$p(L, G|d^P(i), d^H(i)) = p(P|d^P(i), d^H(i)) \, p(L|G).$$

Finally after completing five passes, the system may leave remaining ambiguous logo frames as errors.

Information of replay segments may be automatically extracted using the described technique or in combination with other types of information in providing accurate and versatile video summary highlights.

Scoreboard Detection

A number of techniques have been developed to detect the existence of text in video. These text identification techniques attempt to solve the general problem of identifying text in video and localization in video. In many cases these techniques identify potential regions of text in video as artificial regions that have high contrast and high spatial frequency, and remain stable along the time axis for tens to hundreds of frames. Many of the features identified in these techniques include corners, edges, and texture, which may be extracted in the spatial domain or in a converted domain such as the wavelet domain. High-level classifiers are usually employed by the techniques such as multi-layer neural network, K-means algorithm, or preset thresholds. See, A. Wernicke, R. Lienhart, "On the segmentation of text in videos," *IEEE ICME* 2000, vol. 3, pp 1511-1514, 2000; H. Li, D. Doermann, O. Kia, "Automatic text detection and tracking in digital video," *IEEE tran. Image processing*, vol. 9 no. 1, January 2000; T. Sato, T. Kanade, E. K. Hughes, M. A. Smith, S. Satoh, "Video OCR: indexing digital news libraries by recognition of superimposed captions," in *ACM Multimedia Systems Special Issue on Video Libraries*, February 1998; J. Xie, X.-S. Hua, X.-R. Chen, W. Liu, H.-J. Zhang, "A video text detection and recognition system," *IEEE ICAIE* 2001, 2001; M. Bertini, C. Colombo, A. Del Bimbo, "Automatic caption localization in videos using salient points," *IEEE ICME* 2001, 2001; V. WU, R. Manmatha, E. I. Riseman, "TextFinder: an automatic system to detect and recognize text in images," *IEEE PAMI*, vol. 21, no. 11, November 1999. Unfortunately, these techniques are highly computationally intensive and the resulting performance is poor.

In order to determine interesting segments of the video for summarization, such as replay segments, the present inventors determined that the existence of a scoreboard in the video provides an indication of an associated replay segment and also potentially an interesting event. For example, a scoreboard is overlaid on the frames of football and baseball broadcast video. As an initial matter the spatial position of the scoreboard, if it exists in a frame, should be determined.

To determine important segments, such as replay segments, the present inventors determined that typical production practice followed by the producers of football and baseball broadcast programs: scoreboards are not overlaid on frames during replays, may be used to determine or otherwise verify the identification of replay segments. It may be desirable to detect and filter out replay segments, for example in generation of game summaries composed of only unique event segments, from a set of segments containing events and replays of those events. Events and replays of events can be automatically detected using any suitable technique, such as slow motion replay techniques.

The present inventors determined that the scoreboard may be detected by considering unique features associated with the scoreboard in broadcast video. Specifically, the system may make use of one or more of the following cues:

(1) there is only one scoreboard in a frame;
(2) a scoreboard is either at one, or one of the two possible locations during a particular sports video program (e.g., one location in a baseball broadcast, and either top left or top right in a football broadcast depending on the team in offence);
(3) most frames are dominated by the court or field; and
(4) a scoreboard appears in the frames of "plays". A "play" is defined as a segment in which the game is ongoing and players are in action.

As discuss below, a scoreboard detection technique may be used in combination with automatic identification of replay segments in broadcast video. A segment in general may be further characterized by the existence or non-existence of an associated scoreboard.

A scoreboard is rich with information that is useful for an audience to understand and follow a game. For example, a scoreboard in a baseball game typically shows the scores, the current inning number, the strike count, and the out count. For example, a scoreboard in a football game broadcast typically shows the scores, the quarter number, the game clock, the play clock, and the attempt number. For example, in a soccer game broadcast, the scoreboard typically shows the score and the game time. Detection of the existence scoreboard is an initial task in identifying the information in the scoreboard.

The existence or non-existence of a scoreboard overlay on the video gives information about the current status of a sporting event, such as a football game or a baseball game. It indicates whether the game is being actively played, or paused/stopped, respectively. In baseball or football broadcast video, a scoreboard is normally only shown in the frames of an ongoing play segment; scoreboard is not shown in replay or non-play segments. In a soccer game, on the other hand, a scoreboard is normally always on at every frame because soccer is not the type of "play" and "non-play" game. Furthermore, locations of the scoreboard also tell audiences which team is at offence or defence in a football game. For football video, the scoreboard on the left side of the screen indicates that the team on left-hand side is at offence and the team on right-hand side is at defence, and vice versa.

Figures 17A, 17B, 17C:
FIG. 17 shows examples of scoreboards of a football broadcast video from two broadcasters.

The shape of a scoreboard and its position within a frame are broadcaster-dependent. For example, as shown in FIG. 17, Fox Sports usually puts a strip bar with its length spanning the whole frame at the top for both baseball and football. ESPN uses a close-to-square rectangular bar at the top-left of a frame in a baseball broadcast video, and a rectangular bar at the top-left of a frame or the top-right of a frame, depending on which side is at offense in a football game. Examples of various types of scoreboards typically used in a football broadcast are shown in FIG. 17.

Initially the system should automatically detect the frames that contain a scoreboard overlay in broadcast sports video, and accordingly localize the position of the scoreboard. It is also be to be understood that the system may include manual identification with the assistance of user input of the location of the scoreboard overlay. The preferred scoreboard technique has two main parts: training and inference. In many cases it is desirable to perform the training in an on-line, low-latency implementation. For a low-latency implementation the training is preferably performed in two parts, where the second training is invoked only when the first training is not sufficient and the second training is integrated into the inference phase.

To meet the requirements of on-line, low latency implementation, the first training may use a limited number of frames for training. In the case of baseball, where the scoreboard location does not change, the first training is sufficient and the second training step is skipped. This is also the case for football video if the broadcaster uses a single scoreboard as shown in FIG. 17(*a*). In case of football, when the broadcaster uses two different positions for the scoreboard, e.g., as shown in FIGS. 17(*b*) and 17(*c*), depending on the team at the offence, the second training step may be needed, as described later. Due to the on-line and low-latency requirements, if necessary, this additional training is preferably performed in parallel to the inference process and only with a limited number of frames.

In the inference phase, if all the necessary parameters are obtained in the first training step, the learned template is compared to the corresponding area of each frame to determine the existence of a scoreboard. Otherwise, the inference process engages the second training step till it is completed. After completion of the second training step, the inference continues without further training.

The scoreboard detection may be applied to filtering out replays from the "candidate plays" otherwise detected. Candidate play segments may be plays or replays of plays, non-plays that are falsely detected, or otherwise general segments of the video. The existence/non-existence of a scoreboard may be used as a cue in discriminating plays from replay and non-play segments in case of football and baseball broadcast videos. Using an additional cue provided by slow motion detection, the system may resolve candidate plays into plays, replays, likely replays or non-plays. Otherwise, the existence or non-existence of an associated scoreboard may be used to select segments in general.

First Training

Figure 18:
FIG. 18 shows an image obtained by averaging 3500 frames.

Training in general is based on the fact that during an entire broadcast video, scoreboards are normally at the same location(s) in different frames, and the remaining areas of frames are dominated by the field or court in most times. Therefore, if a sufficient number of frames containing scoreboard are averaged, then the resulting average image has a clear scoreboard and smeared background that is dominated with the color of the field or the court. In essence, the scoreboard is less blurred than the background. It is to be understood that any statistical process using a plurality of frame may be used, as desired. As an example, an average of 3500 frames containing scoreboard in a football broadcast video is shown in FIG. 18.

Figure 19:
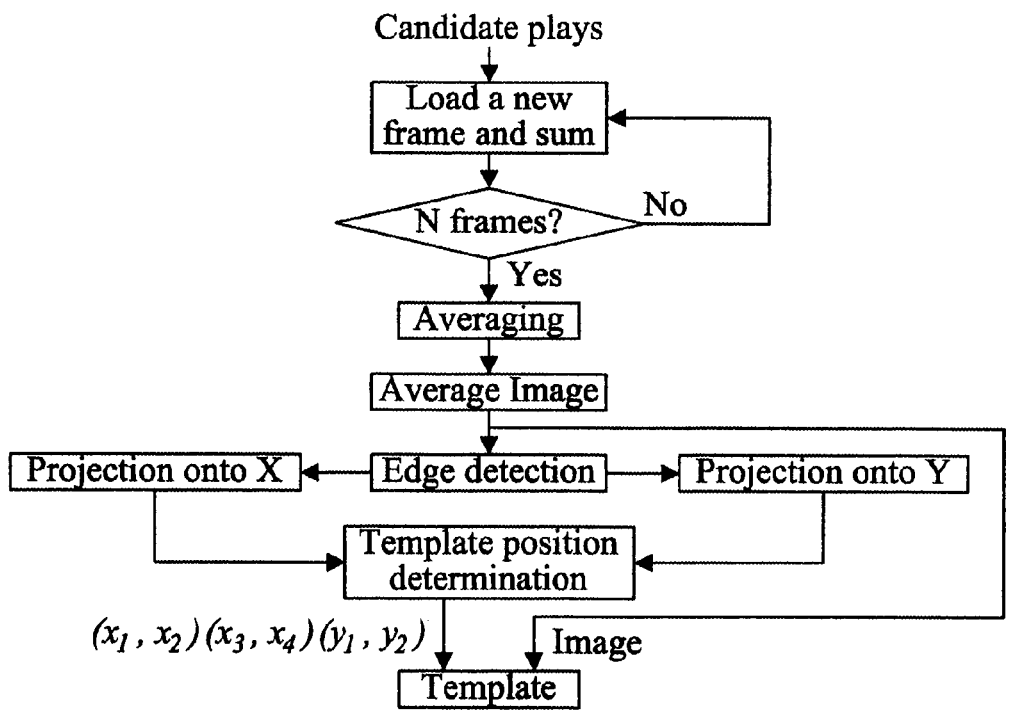
FIG. 19 shows steps of first training resulting in a template.

The preferred framework of training is shown in FIG. 19. The steps of first training are discussed below.

Averaging

A sufficient number of frames (e.g., >1) with scoreboard are used as training data. To make the training fully automatic, the system may use "candidate plays" in baseball and football games that are detected by other techniques. While some frames in detected candidate plays may not have a scoreboard, in most cases a substantial number (e.g., a majority) of the frames in the detected candidate plays do contain a scoreboard. By averaging (any statistical process) a sufficient number of these frames, the content present in a sufficient number of the frames will dominate the average image. In other words, the scoreboard in the average image remains substantially clear while the rest of the average image is blurred due to averaging a large number of frames in detected plays.

For an online, low-latency real-time video processing system, short training time is useful. In one particular implementation, the minimum number of training frames is set to 3500. A multitude of candidate plays are typically used in order to reach the minimum number of training frames. Averaging is conducted in the RGB color space. It is to be understood that other color spaces may also be used, as desired. One example of the image generated by averaging 3500 frames is shown in FIG. 18.

Edge Detection by Prewitt Edge Operator

Figure 20A:
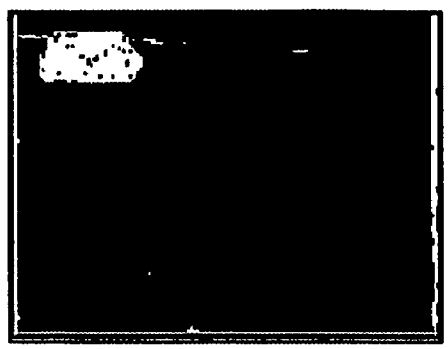
FIG. 20 shows binary edge images.
Figure 20B:
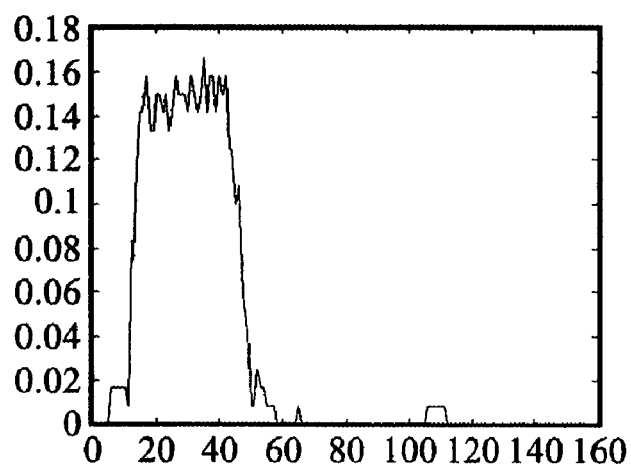
Figure 20C:
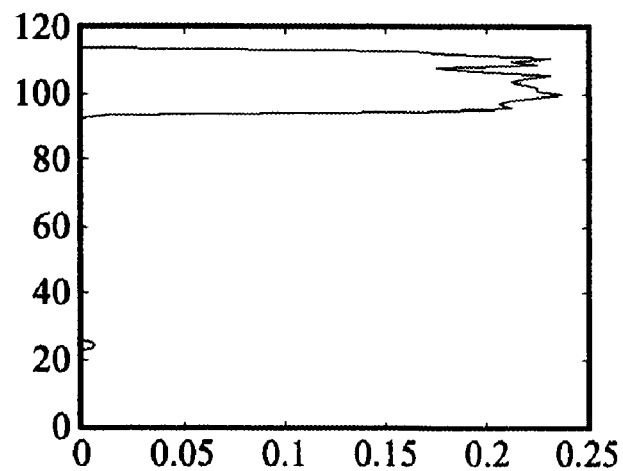

As shown in FIG. 20, edge detection may be applied to resulting average image. Because the scoreboard in the average image is sufficiently clear and the background is sufficiently blurred (e.g., otherwise the background is more blurred than the scoreboard), the edge detection operator is not distracted and the scoreboard will respond strongly to the edge detection operator. Many methods of edge detection are applicable. In one implementation, the colored average image may be converted into a gray-level image, and then use the Prewitt edge detection method to detect edges in the gray image. The two 2-D convolution kernels of Prewitt detection may be:

| -1 | -1 | -1 |
|----|----|----|
| 0  | 0  | 0  |
| 1  | 1  | 1  |

| -1 | 0 | 1 |
|----|---|---|
| -1 | 0 | 1 |
| -1 | 0 | 1 |

The first kernel aims at detecting horizontal edges and the second kernel aims at detecting vertical edges. Thereafter, the detected edge image may be binarized. One example of the resulting binary image is shown in FIG. 20(*a*), from which one can observe that only the scoreboard area (top left corner) is populated by edges due to its relatively rich texture of numbers and texts information within.

Projection Onto X & Y

The 2-D edge images may be projected horizontally and vertically, and obtain two 1-D distributions, as shown in FIGS. 20(*b*) and 20(*c*).

Determination of the Template

The thresholds to the two 1-D projections may be set in order to determine the position(s) and size of the scoreboard. Specifically, the starting and ending points of the peak of the vertically projected distribution, $(y_1, y_2)$, define the vertical position and size of the scoreboard. The situation is the same for the horizontally projected distribution in the case of a baseball game broadcast video. In broadcast video of a football game, however, a scoreboard may have two possible positions in a frame, and two positions are horizontally symmetric along the vertical central line of the frame. Therefore, there are two peaks in the horizontal distribution (but still one peak in the vertical distribution), and two sets of starting and end points, $(x_1, x_2)$ and $(x_3, x_4)$, define the two possible positions of the scoreboard. Finally, a template is built, consisting of the colored average image and position information $(x_1, x_2)$ and $(x_3, x_4)$ and $(y_1, y)$.

In the training phase for a football video, however, if scoreboards in the most frames in the training data set are dominantly on the one single side due to the particular game dynamics, then the training is only able to yield one position. In that case, the additional online training step is necessary to train for the other position.

Inference

Figure 21:
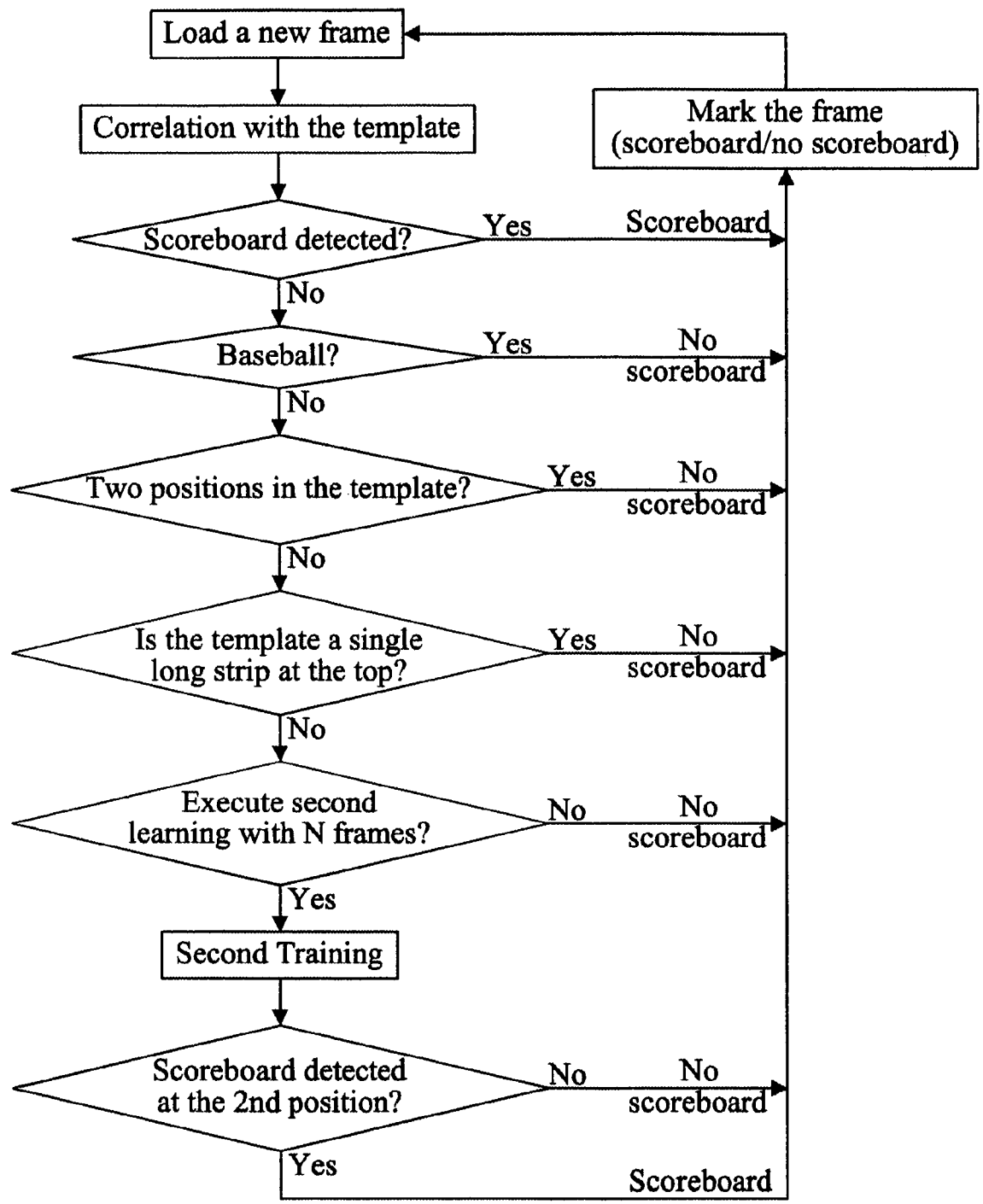
FIG. 21 shows an inference process.

The framework of the inference process is shown in FIG. 21. It has a correlation module and an optional second training module. The core inference process is based on simple correlation computation. Correlation of each frame with the template is computed in the RGB space and thresholded.

If $tmpt_R(x,y)$ is the R component of pixel $(x,y)$ in the template image and $I_R(x,y)$ is the R component of pixel $(x, y)$ in the input image, then the correlation coefficient, $coff_R$, between the R components of the template and of the input image at the scoreboard area, defined by $(x_1, x_2)$ and $(y_1, y_2)$, is shown in FIG. 22.

Similarly, the system may also define $coff_G$ for the G component and $coff_B$ for the B component. The final correlation coefficient coff is the average of $coff_R$, $coff_G$, and $coff_B$.

If the coefficient coff is above a pre-selected threshold, then the frame is considered to contain a scoreboard at $(x_1, x_2)$ and $(y_1, y_2)$. In football broadcast video, if a second scoreboard position at $(x_3, x_4)$ and $(y_1, y_2)$ is trained, then the similar method is applied to determine if a frame contains a scoreboard at $(x_3, x_4)$ and $(y_1, y_2)$.

If the game is a baseball game, the second training is preferably not used. If the game is a football game, but the scoreboard position information indicates that the scoreboard is of type shown in FIG. 17(a), that is a strip spanning the top of the frame, the second training is not used. If the game is a football game, and the scoreboard position information indicates that two symmetric scoreboard positions are successfully learned during the first learning process, the second training is not used. Typically, in case of football videos where two different scoreboard positions are used, only one of the positions is learned during the first learning step. Hence, for football videos where the learned template is not a strip spanning the top of the frames, and the position information indicates a single scoreboard position, the second learning is invoked within the inference step. The second learning continues till a minimum number frames is used for training.

Second Training

For football videos where the learned template is not a strip spanning the top of the frames, and the position information indicates a single scoreboard position, the inference step may include the second learning step.

The second training is based on the two observances valid in many cases: (1) the structures of scoreboards at the two different locations are usually very similar, but not identical; (2) the two possible locations are horizontally symmetric about the vertical central line of a frame. The first fact indicates that the structural content of the scoreboard at the other position is unknown, while the second fact indicates that the location of the second scoreboard is known. Other structures may likewise be determined.

The second learning uses the color histogram of the scoreboard template at the already learned position, henceforth referred to as "template color histogram". The inference module may execute the following steps when the correlation module fails to detect a scoreboard.

(1) Calculate the color histogram of the area that is horizontally symmetric to the learned position about the vertical central line of the frame;
(2) Calculate the mean-square error (MSE) between the template color histogram and the color histogram computed in Step (1); if the MSE falls below a threshold, then the current frame contains a scoreboard and the area that is horizontally symmetric to the already learned area contains the scoreboard. Otherwise, the current frame does not contain a scoreboard and is not used for training for the second scoreboard.
(3) Accumulate N frames that contain a second scoreboard, determined according to Step 2. Then, the accumulated frames are averaged and the area in the average image that is horizontally symmetric to the first scoreboard is extracted and placed in the corresponding area in the template, resulting in a template with two symmetrically located scoreboards.

Once the number of frames used in averaging in Step (3) reaches N, the second training is disengaged and pure inference continues without training.

Replay Filtering Football and Baseball Summarization

Candidate plays detected by existing algorithms may correspond to plays, replays, or non-plays. Using the results of scoreboard detection, replays or non-plays can be filtered out from the set of candidate plays in order to obtain a set of unique plays. Unique plays may be desired in forming compact summaries with no redundancy. The following 3-step decision process may be applied to the candidate plays in order to identify replays and non-plays.

(1) A candidate play is identified as a replay if the candidate play contains no scoreboard in its frames but contains slow motion;
(2) A candidate play is identified as a play if the candidate play contains scoreboard in its frames but contains no slow motion;
(3) A candidate play is identified as a likely replay/non-play if the candidate play contains no scoreboard in its frames and contains no slow motion either.

Under many conditions, the second learning is not needed in a batch mode implementation where the entire video to be processed is accessible. Hence, in a batch mode implementation, the second learning step within the inference process does not have to be invoked.

Since a scoreboard is widely used in many other types of broadcast sports, the methodology in this invention is also applicable to many other types of sports. Although in some sports, such as soccer, scoreboard is always shown and existence of scoreboard gives little information, detection of scoreboard as discussed here could serve as the first step of retrieving the contents in scoreboard.

A summarization presented to the user may be hierarchical in nature, if desired. The desired summary may be selected by the user. Referring to FIG. 22, the summary may be the concatenation of the replay segments. The next summary may be the concatenation of the live segments. The next summary may be the concatenation of the live and replay segments. The next summary may be the concatenation of the live, close-up, and replay segments. Also, the techniques taught herein may be applicable to other sporting broadcasts, such as for example, ice hockey.

The summary description defines those portions of the video sequence that contain the relevant segments for the video summarization. The summary description may be compliant with the MPEG-7 Summary Description Scheme or TV-Anytime Segmentation Description Scheme. A compliant media browser may apply the summary description to the input video to provide summarized viewing of the input video without modifying it. Alternatively, the summary description may be used to edit the input video and create a separate video sequence. The summarized video sequence may comprise the selected segments which excludes at least a portion of the original video other than the plurality of segments. Preferably, the summarized video sequence excludes all portions of the original video other than the plurality of segments.

Figure 23:
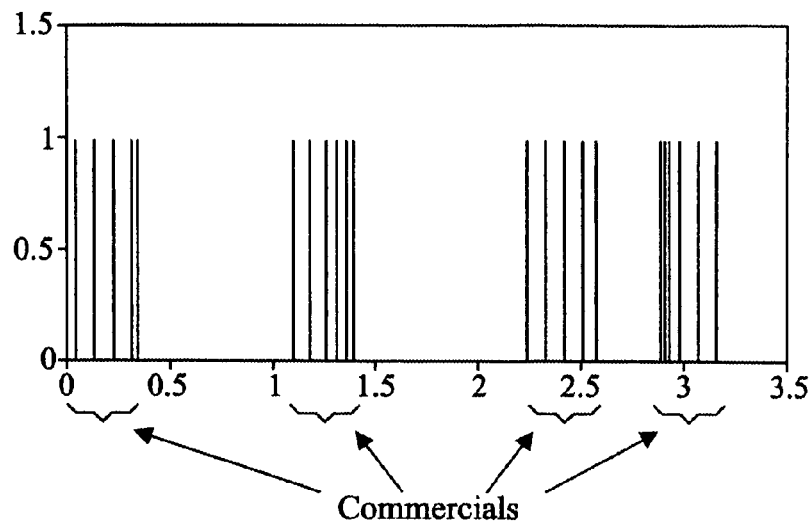
FIG. 23 shows the distribution of black frames in a video.
Figure 24:
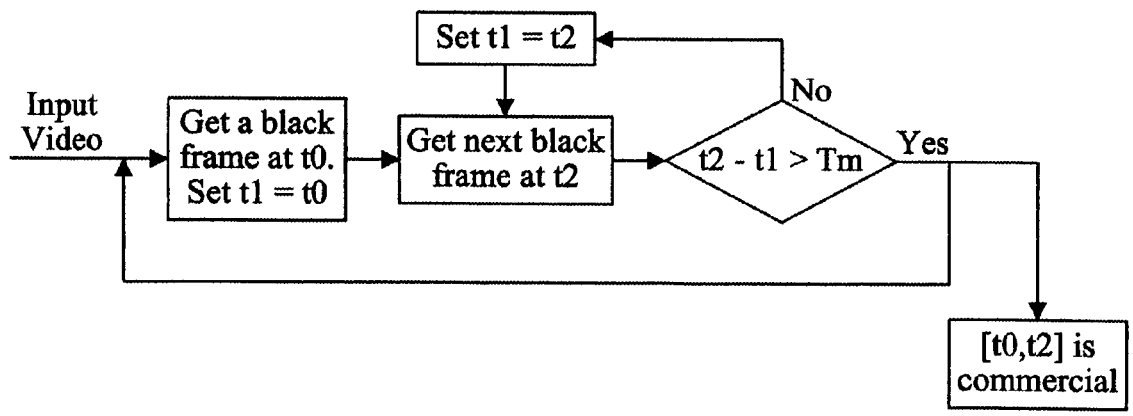
FIG. 24 shows cluster detection.

A commercial detection module may be used to further refine the potential replay segments by removing those segments that are contained within commercials. In the broadcast industry, one or more black frames are inserted into the program to separate different commercials in the same commercial session. Referring to FIG. 23, an example of the distribution of black frames in a video of 35,000 frames, where a line shows the location of a black frame. Visually, it becomes apparent that the clusters of black frames are commercials. One technique for the detection of clusters, is shown in FIG. 24. The algorithm presumes that a regular program session will last at least Tm minutes. For example, Tm is typically larger than three minutes. On the other hand, it is unlikely that a single commercial will last more than two minutes. Thus, as long as black frames are used to separate different commercials in a commercial session, the preferred system will operate properly. By setting Tm reasonably large (e.g., three minutes), the system can still detect commercials even if not all the commercials in a commercial session are separated by black frames. Also, a reasonably large Tm will reduce the likelihood that the regular program is mis-classified as a commercial.

Figure 25:
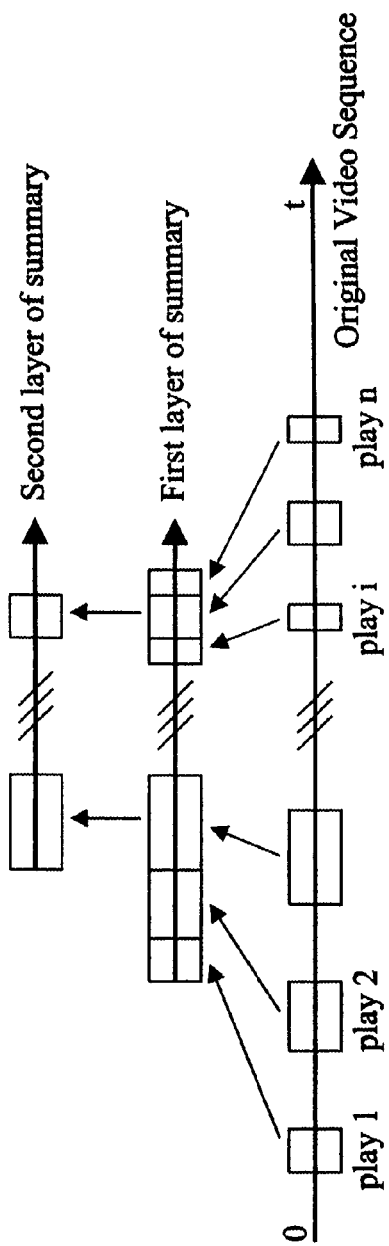
FIG. 25 illustrates a summary construction.

Referring to FIG. 25, the first layer of the summary is constructed using the play detection technique. The second and third layers (and other) are extracted as being of increasingly greater excitement, based at least in part, on the audio levels of the respective audio of the video segments. Also, it would be noted that the preferred audio technique only uses the temporal domain, which results in a computationally efficient technique. In addition, the level of the audio may be used as a basis for the modification of the duration of a particular play segment. For example, if a particular play segment has a high audio level then the boundaries of the play segment may be extended. This permits a greater emphasis to be placed on those segments more likely to be exciting. For example, if a particular play segment has a low audio level then the boundaries of the play segment may be contracted. This permits a reduced emphasis to be placed on those segments less likely to be exciting. It is to be understood that the layered summarization may be based upon other factors, as desired.

Figure 26:
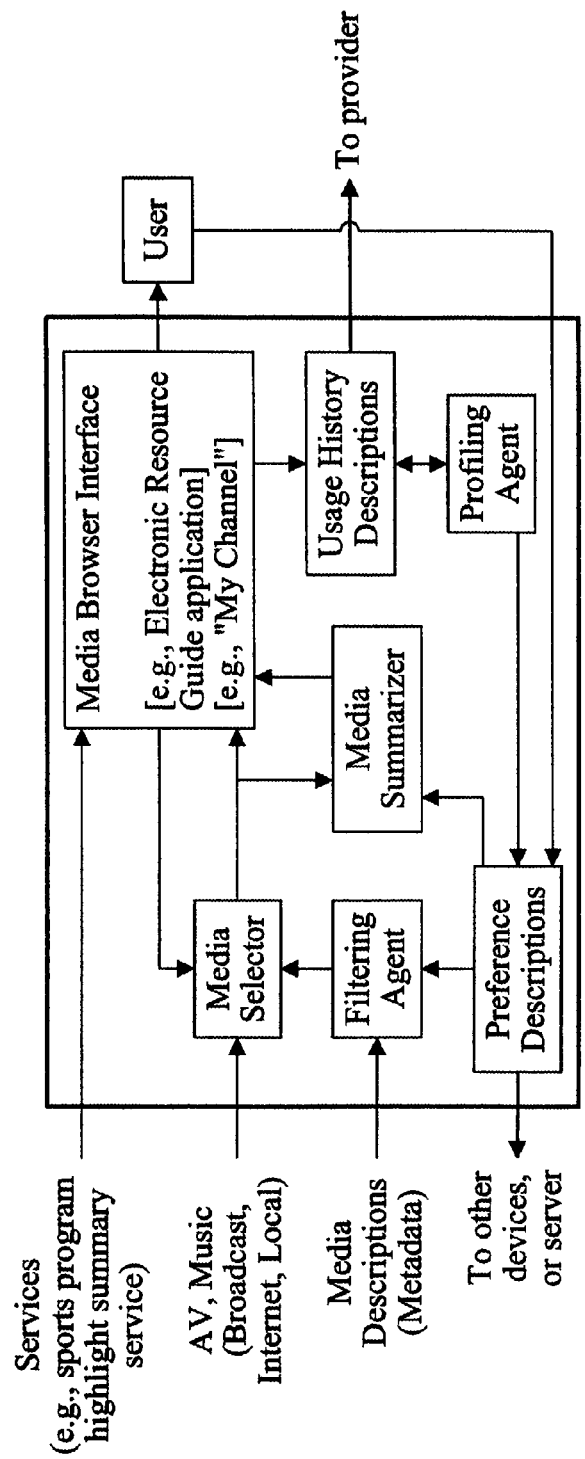
FIG. 26 shows an MPEG-7 browser and filter.

Referring to FIG. 26, the video summarization may be included as part of an MPEG-7 based browser/filter, where summarization is included within the standard. With different levels of summarization built on top of the aforementioned video summarization technique, the system can provide the user with varying levels of summaries according to their demands. Once the summary information is described as an MPEG-7 compliant XML document, one can utilize all the offerings of MPEG-7, such as personalization, where different levels of summaries can be offered to the user on the basis of user's preferences described in an MPEG-7 compliant way. Descriptions of user preferences in MPEG-7 include preference elements pertaining to different summary modes and detail levels.

In the case that the summarization is performed at a server or service provider, the user downloads and receives the summary description encoded in MPEG-7 format. Alternatively, in an interactive video on demand (VOD) application, the media and its summary description reside at the provider's VOD server and the user (e.g., remote) consumes the summary via a user-side browser interface. In this case, the summary may be enriched further by additional information that may be added by the service provider. Further, summarization may also be performed by the client.

Figure 27:
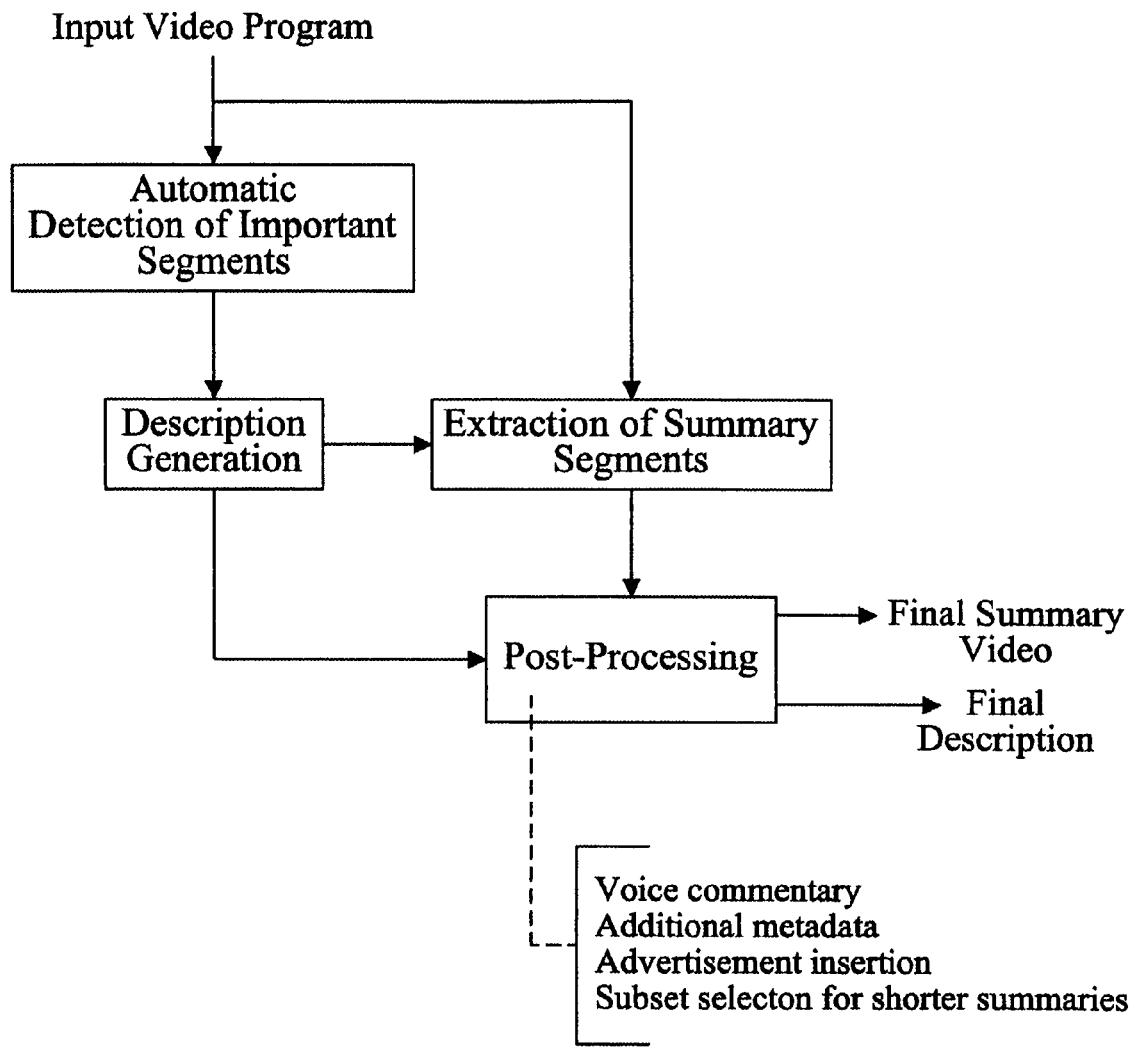
FIG. 27 shows a video processing system.

Referring to FIG. 27, the output of the module that automatically detects important segments may be a set of indices of segments containing plays and important parts of the input video program. A description document, such as an MPEG-7 or TV-Anytime compliant description is generated in *The Description Generation* module. Summary segments are made available to the Post-Processing module by *The Extraction of Summary Segments* module which processes the input video program according to the description. A post-processing module processes the summary Segments and/or the description to generate the final summary video and final description. The post-processing module puts the post-processed segments together to form the final summary video. The post-processing module may transcode the resulting video to a format different that of the input video to meet the requirements of the storage/transmission channel. The final description may also be encoded, e.g. binarized if it is generated originally in textual format such as XML. Post-processing may include adding to the original audio track a commentary, insertion of advertisement segments, or metadata. In contrast to play detection, post-processing may be completely, or in part, manual processing. It may include, for example, automatic ranking and subset selection of events on the basis of automatic detection of features in the audio track associated with video segments. This processing may be performed at the server and then the resulting video transferred to the client, normally over a network. Alternatively, the resulting video is included in a VOD library and made available to users on a VOD server.

It is to be understood that the locating of the "logo transitions" may be manually identified, if desired. Then other parts of the system may be based upon the manual identification.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow. All references cited herein are hereby incorporated by reference.

We claim:

1. A method of processing a video comprising plurality of frames, said method comprising:
    (a) identifying a slow motion replay segment of said video, where said slow motion replay segment includes at least one of said plurality of frames of said video; and
    (b) identifying at least one of a starting logo transition within said video based upon said slow motion replay segment and an ending logo transition within said video based upon said slow motion replay segment; and
    (c) identifying at least one replay segment of said video, apart from said slow motion replay segment, based on the identified said logo transition, and creating a summary of said video that includes said identified at least one replay segment, said summary having fewer said frames than said video.

2. The method of claim 1 further comprising identifying non-slow motion replay segments based upon said starting logo transition.

3. The method of claim 1 further comprising identifying non-slow motion replay segments based upon said ending logo transition.

4. The method of claim 1 wherein at least one of said starting logo transition and said ending logo transition are identified in the same general spatial region of a respective frame.

5. The method of claim 1 wherein said general spatial region is the central portion of said respective frame.

6. The method of claim 1 wherein said identifying of said at least one of said starting logo transition and said ending logo transition is free from user input.

7. A method of processing a video comprising plurality of frames, said method comprising:
   (a) identifying a slow motion replay segment of said video, where said slow motion replay segment includes at least one of said plurality of frames of said video; and
   (b) identifying at least one of a starting logo transition within said video based upon frames within 1000 frames of said replay segment and an ending logo transition within 1000 frames of said replay segment; and
   (c) identifying at least one replay segment of said video, apart from said slow motion replay segment, based on the identified said logo transition, and creating a summary of said video that includes said identified at least one replay segment, said summary having fewer said frames than said video.

8. The method of claim 7 further comprising identifying non-slow motion replay segments based upon said starting logo transition.

9. The method of claim 7 further comprising identifying non-slow motion replay segments based upon said ending logo transition.

10. The method of claim 7 wherein at least one of said starting logo transition and said ending logo transition are identified in the same general spatial region of a respective frame.

11. The method of claim 7 wherein said general spatial region is the central portion of said respective frame.

12. The method of claim 7 wherein said identifying of said at least one of said starting logo transition and said ending logo transition is free from user input.

* * * * *

UNITED STATES PATENT AND TRADEMARK OFFICE
CERTIFICATE OF CORRECTION

PATENT NO. : 7,653,131 B2  Page 1 of 2
APPLICATION NO. : 11/292917
DATED : January 26, 2010
INVENTOR(S) : Hao Pan and Baoxin Li It is certified that error appears in the above-identified patent and that said Letters Patent is hereby corrected as shown below:

Col. 7, Lines 27-28

Change

" $ind_{mn}, ind_{mn}, k_{mn}, d_{mn} = arg\ min(d_{i,j,k}{}^{(k)}(i,j)) i \epsilon Q_m, j \epsilon Q_n, k = 0, 1, \ldots K-1$ "

to read

-- $ind_{mn}, ind_{nm}, k_{mn}, d_{mn} = arg\ min(d^k_{i,j,k}(i,j))\ i \epsilon Q_m, j \epsilon Q_n, k = 0, 1, \cdots K-1$ --.

Col. 7, Line 35

Change " $d^k(,j) = \beta d^{(k)P}(i,j) + (1-\beta)d^{(k)H}(i,j),$ "

to read -- $d^k(i,j) = \beta d^{(k)P}(i,j) + (1-\beta)d^{(k)H}(i,j),$ --.

Col. 8, Line 14

Change " $ind^{(k)}{}_{mn}.$ " to read -- $ind^{(k)}{}_{nm}.$ --.

Col. 8, Line 33

Change "$k_{mn}$" to read -- $k_{nm}$ --.

Signed and Sealed this

Fourteenth Day of September, 2010

David J. Kappos
*Director of the United States Patent and Trademark Office*

Col. 10, Line 51

Change "$p^H(y|p) = l(m_H - 2s_H).$" to read -- $p^H(y|P) = l(m_H - 2s_H).$ --.

Col. 12, Line 2

Change "$S_L$" to read -- $s_L$ --.

Col. 12, Line 38

Change "$p(L, G | d^P(i), d^H(i); d^P(j), d^H(i)).$" to read -- $p(L, G | d^P(i), d^H(i); d^P(j), d^H(j))$ --.

Col. 12, Line 41

Change "$(d^P(i), d_H(i))$" to read -- $(d^P(i), d^H(i))$ --.

Col. 12, Lines 61-62

Change "$p(P | d^P(i), d^H(i); d^P(i), d^H(j)) \approx p(P | d^P(j), d^H(j)) p(P | d^P(i), d^H(i))$"

to read -- $p(P | d^P(i), d^H(i); d^P(j), d^H(j)) \approx p(P | d^P(j), d^H(j)) p(P | d^P(i), d^H(i))$ --.